United States Patent
Arendt et al.

(10) Patent No.: US 9,758,637 B2
(45) Date of Patent: *Sep. 12, 2017

(54) BLENDS OF DIBENZOATE PLASTICIZERS

(71) Applicant: EMERALD KALAMA CHEMICAL, LLC, Kalama, WA (US)

(72) Inventors: William D. Arendt, Libertyville, IL (US); Emily McBride, Kalama, WA (US)

(73) Assignee: EMERALD KALAMA CHEMICAL, INC., Kalama, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/928,364

(22) Filed: Oct. 30, 2015

(65) Prior Publication Data

US 2016/0053085 A1    Feb. 25, 2016

Related U.S. Application Data

(62) Division of application No. 13/976,062, filed as application No. PCT/US2011/067572 on Dec. 28, 2011, now Pat. No. 9,193,843.

(60) Provisional application No. 61/460,329, filed on Dec. 30, 2010, provisional application No. 61/460,330, filed on Dec. 30, 2010, provisional application No. 61/464,731, filed on Mar. 8, 2011.

(51) Int. Cl.

| | |
|---|---|
| *B60C 1/00* | (2006.01) |
| *C08K 5/12* | (2006.01) |
| *C08K 5/06* | (2006.01) |
| *C09D 7/12* | (2006.01) |
| *C09D 11/03* | (2014.01) |
| *C09J 11/06* | (2006.01) |
| *C08K 5/00* | (2006.01) |
| *C08K 5/103* | (2006.01) |
| *C08K 5/10* | (2006.01) |

(52) U.S. Cl.
CPC .............. *C08K 5/12* (2013.01); *C08K 5/0016* (2013.01); *C08K 5/06* (2013.01); *C08K 5/10* (2013.01); *C08K 5/103* (2013.01); *C09D 7/1233* (2013.01); *C09D 11/03* (2013.01); *C09J 11/06* (2013.01); *C08K 2201/014* (2013.01)

(58) Field of Classification Search
CPC .......... C08K 5/06; C08K 5/12; C08K 5/0016; C08K 5/103
USPC .................. 106/505; 524/291, 292
See application file for complete search history.

(56) References Cited

U.S. PATENT DOCUMENTS

| | | | |
|---|---|---|---|
| 3,652,291 A | 3/1972 | Bedoukian | |
| 4,950,702 A | 8/1990 | Arendt | |
| 5,236,987 A | 8/1993 | Arendt | |
| 5,319,028 A | 6/1994 | Nakamura et al. | |
| 5,676,742 A * | 10/1997 | Arendt .................. | A01N 37/36 106/15.05 |
| 5,990,214 A | 11/1999 | Arendt et al. | |
| 6,184,278 B1 | 2/2001 | Arendt et al. | |
| 6,448,463 B1 | 9/2002 | Fischer et al. | |
| 6,583,207 B2 | 6/2003 | Stanhope et al. | |
| 7,056,966 B2 | 6/2006 | Stanhope et al. | |
| 7,071,252 B2 | 7/2006 | Stanhope et al. | |
| 7,629,413 B2 | 12/2009 | Godwin et al. | |
| 7,812,080 B2 | 10/2010 | Arendt et al. | |
| 7,855,340 B2 | 12/2010 | Gosse et al. | |
| 7,872,063 B2 | 1/2011 | Strepka et al. | |
| 8,034,860 B2 | 10/2011 | Arendt et al. | |
| 9,169,372 B2 * | 10/2015 | Arendt .................. | C08K 5/12 |
| 9,193,843 B2 * | 11/2015 | Arendt .................. | C08K 5/12 |
| 2003/0092808 A1* | 5/2003 | Stanhope ............... | C08K 5/103 524/291 |
| 2005/0154147 A1 | 7/2005 | Germroth et al. | |
| 2005/0239636 A1 | 10/2005 | Gao et al. | |
| 2008/0021141 A1 | 1/2008 | Arendt et al. | |
| 2008/0103237 A1* | 5/2008 | Strepka .................. | C09D 5/024 524/306 |
| 2008/0139680 A1 | 6/2008 | Arendt et al. | |
| 2009/0036581 A1 | 2/2009 | Joshi et al. | |
| 2009/0326121 A1 | 12/2009 | Stockl et al. | |
| 2010/0003879 A1 | 1/2010 | Conesa | |

* cited by examiner

*Primary Examiner* — Kelechi Egwim
(74) *Attorney, Agent, or Firm* — Hudak, Shunk & Farine Co. LPA

(57) ABSTRACT

Plasticizer blends comprise a triblend of diethylene glycol dibenzoate, dipropylene glycol dibenzoate, and 1,2-propylene glycol dibenzoate, in specified ratios, useful in combination with a multitude of thermoplastic polymers, thermosetting polymers, and elastomeric polymers and numerous applications, including but not limited to plastisols, adhesives, sealants, caulks, architectural coatings, industrial coatings, OEM coatings, inks, overprint varnishes, polishes, and the like. The advantages rendered by the use of the triblend depend on the type of polymer and application in which it is utilized and include among other advantages higher solvating power and lower processing time, low VOC's, reduced plasticizer freeze point, improved gelation and fusion characteristics, higher tensile strength, superior stain and extraction resistance, and improved rheology over traditional diblends of diethylene glycol dibenzoate and dipropylene glycol dibenzoate.

11 Claims, 23 Drawing Sheets

BLENDS OF DIBENZOATE PLASTICIZERS

FIELD OF THE INVENTION

The present invention relates to a non-phthalate plasticizer triblend comprising dibenzoate plasticizers, in specific proportions, all of which are compatible with each other and can be utilized in a variety of polymer applications traditionally requiring plasticizers, including but not limited to plastisols, adhesives, caulks, architectural coatings, industrial coatings, OEM coatings, inks, overprint varnishes, other coatings, polishes and the like. The inventive plasticizer blends improve performance properties of the polymer, such as processability and stain and extraction resistance, among others. The invention is also directed to polymeric compositions comprising the plasticizer triblend, such as plastisols and adhesives.

BACKGROUND OF THE INVENTION

Plasticizers, as polymer additives, are established main line additives and have been known for more than a century. Most high volume plasticizers have been developed in the last seventy years, primarily for use with vinyl and other polymeric substances. Significant volumes are sold, and plasticizers are used more than any other type of polymer additives, particularly in polyvinyl chloride (PVC) applications. PVC can be formulated into a tremendous number of products and is useful in innumerable applications. Plasticizers provide versatility to PVC and are key ingredients and tools for the vinyl formulator. They are used to adjust hardness (or softness), impart stain resistance, alter tensile properties (such as strength, elongation or flexibility) and processability as required for a multitude of applications, including without limitation flexible vinyl applications. While hundreds of plasticizers have been produced, only a few remain having acceptable performance properties when combined with vinyl or other polymeric materials.

There are a number of different types of plasticizers: 1) general purpose, 2) specialty types (such as high solvators), and 3) secondary types (oils) and diluent types (isodecyl benzoate, for example). Plasticizer additives are available in a wide variety of alternative chemistries.

In addition to chemistry type, plasticizers are categorized and distinguished based on their ability to solvate dispersed solid polymers and/or their gelation and fusion temperatures in plastisols. Gelation and fusion temperatures dictate the speed of production and are influenced by the solvating power of the plasticizer. By way of example, the gelation and fusion temperatures of a plastisol containing a dibenzoate plasticizer will be lower than a plastisol containing a general purpose phthalate, thus enabling speed of processing in that particular application.

Plasticizers serve as a vehicle for the dispersion of resin (polymer) particles, such as PVC. The dispersion is initially a two-phase, heterogeneous system. Use of plasticizers in polymeric dispersions promotes the formation of homogeneous systems and polymer fusion occurs upon heating. The higher the solvating power, the lower the temperature at which a homogeneous system is fused, which, in turn, decreases the residence time and increases the speed at which polymeric compositions can be processed into an end product, resulting in a faster, more efficient and economical process.

General Purpose Plasticizers.

General purpose plasticizers provide an excellent compromise between performance characteristics and economy for most applications. Some examples include: bis (2-ethylhexyl phthalate) (DEHP or DOP), diisononyl phthalate (DINP), dioctyl phthalate (DNOP), diisodecyl phthalate (DIDP), dipropylheptyl phthalate (DPHP), di-2-ethylhexyl terephthalate (DOTP or DEHT), and diisononyl-1,2 cyclohexane dicarboxylate (DIDC or DINCH®) (as described in U.S. Pat. No. 7,855,340). General purpose phthalates dominate the volume of plasticizers purchased every year and are most often selected for compounding flexible vinyl.

Yearly, plasticizer production is in the area of 12 billion pounds, and the general purpose phthalate DOP accounts for about half of the pounds of plasticizer consumed, despite pressure from health and environmental issues encountered with the use of general purpose phthalates.

In view of the ongoing scrutiny of phthalate use, a need has developed for phthalate alternatives. Both DOTP and DIDC are contenders for phthalate replacement in the general purpose market. These two plasticizers are considered "next generation", general purpose "non-phthalate" plasticizers. Even though DOTP, chemically, is a phthalate, it is not an orthophthalate, the use of which is subject to increasing regulatory pressure. These "next generation" phthalate alternatives are viable; however, they do not always give the performance desired in vinyl compositions, particularly in plastisols (i.e., they have poorer compatibility, slow speed, high gel temperatures, low gel strength). Blends of plasticizers can be used to adjust performance, although there may be some limits to this approach.

In addition to DOTP and DIDC, sustainable, "green" types of plasticizers are also contending for the general purpose plasticizer market. Examples include plasticizers based on castor oil and soybean oil.

Some applications, however, require performance that cannot be achieved by use of a general purpose plasticizer alone. Applications that require better resistance to oils and solvents are one such example. General purpose phthalates are easily extracted by nonpolar solvents such as hexanes, such that alternative plasticizers would be a much better choice. There is also a need for plasticizers that are higher solvators for PVC and other polymer applications.

Specialty-type Plasticizers.

Specialty type plasticizers have been developed to fulfill the need for high solvators, the most popular being lower molecular weight phthalates. An example of such a plasticizer is butyl benzyl phthalate (BBP), which is often employed as a high solvating plasticizer. Di-n-butyl phthalate (DBP) and diisobutyl phthalate (DIBP) are also useful high solvator, specialty type plasticizers. Other examples of non-phthalate, high solvating plasticizers include some citric acid esters, alkyl sulfonic acid esters, and certain phosphates. Dibutyl terephthalate (DBTP) and N-alkyl pyrrolidones have also been proposed as a specialty type, high solvator plasticizers.

All of the high solvator plasticizers (regardless of type) add value to vinyl compositions that traditional general purpose plasticizers cannot. Even so, many of the high solvator plasticizers are phthalates, for which safer alternatives are being sought.

Benzoate Ester Plasticizers.

Benzoate ester plasticizers have also been developed as specialty type plasticizers. Benzoate plasticizers have been recognized since the 1940's as useful plasticizers for PVC applications, and subsequently some of these benzoate plasticizers were commercialized. Benzoate plasticizers are well established and have now been in use in PVC applications for decades. By their nature, benzoate plasticizers are non-phthalates; however, they were not created nor specifically established on that basis and were in use well before the demand for phthalate alternatives began. Benzoate plasticizers include monobenzoates and dibenzoates, among others.

Monobenzoate esters useful as plasticizers include: isodecyl benzoate, isononyl benzoate, and 2-ethylhexyl benzoate. "Half ester" monobenzoates include dipropylene glycol monobenzoate and diethylene glycol monobenzoate, which are byproducts of the production of dibenzoates, but which, most of the time, are not objects of production. Monobenzoates are not generally noted for being high solvators, although they may be used in conjunction therewith. Monobenzoates are also not as useful as dibenzoate plasticizers, because they are less compatible than the corresponding dibenzoate with PVC. However, the half esters are compatible with emulsions polymers, such as acrylic and/or vinyl ester polymers.

Classically, dibenzoate plasticizers function well as high solvating plasticizers and are recognized today as some of the best high solvators for PVC applications. Historically, diethylene glycol dibenzoates (DEGDB) and dipropylene glycol dibenzoates (DPGDB) esters are well known and have been used in many applications in the past, including the vinyl industry. DEGDB is an excellent plasticizer, but due to its high freeze point, blends with DPGDB were also developed to capitalize on the utility and lower cost of DEGDB. Several years ago a blend of DEGDB, DPGDB and triethylene glycol dibenzoates (TEGDB) was introduced as a high solvating dibenzoate blend.

State of the Art.

Benzoate ester plasticizers, alone or in a blend with other plasticizers, are commercially available and are described in the literature and in prior patents. Plastisol and organosol compositions, adhesives, caulks, polishes, inks, and a wide variety of coatings containing benzoate plasticizers are also known in the art.

By way of example, U.S. Pat. No. 4,950,702 to Arendt discloses plastisol compositions comprising a polyvinyl resin plasticized with dipropylene glycol monomethyl ether benzoate or tripropylene glycol monomethyl ether benzoate.

U.S. Pat. No. 5,236,987 to Arendt discloses the use of isodecyl benzoate as a coalescent agent for use in paint compositions and in the preparation of plastisols.

U.S. Pat. No. 5,319,028 to Nakamura et al. describes a plastisol composition that comprises PVC resin and a plasticizer used singly, or in combination, that may include, among other plasticizers, glycol derivatives, such as DEGDB, DPGDB, and TEG di-(2-ethylhexoate).

The use of dibenzoate esters alone or in combination with their corresponding monobenzoate ester is described in U.S. Pat. No. 5,676,742 to Arendt et al., which discloses plasticized aqueous polymer compositions useful as latex caulks.

Dibenzoate plasticizer blends used as the primary plasticizer for a plastisol composition are described in U.S. Pat. No. 5,990,214 to Arendt et al., which discloses blends comprising the dibenzoates of both DEG and triethylene glycol for use in plastisol applications.

U.S. Pat. No. 7,812,080 to Arendt et al. describes a plastisol having a dispersed phase and a liquid phase, the liquid phase including dibenzoate plasticizer blends having a hydroxyl number of about 30 or greater indicating a higher half ester monobenzoate content. The plastisols provided are stated to be effective for providing a foamed composition having an improved color.

U.S. Pat. No. 6,583,207 to Stanhope et al. describes the addition of at least about 30 wt. % of DEG or DPG half ester monobenzoates to DEG dibenzoate to form a liquid mixture at around 28° C. Similarly, U.S. Pat. No. 7,056,966 to Stanhope et al. describes the addition of at least 20 wt. % of at least one half ester monobenzoate to at least one dibenzoate to form a liquid mixture at around 28° C. These liquid mixtures are described as effective plasticizers for aqueous polymer compositions, such as adhesives and caulk.

U.S. Pat. No. 7,071,252 to Stanhope et al. describes the use of half ester monobenzoates as secondary plasticizers for non-aqueous and solvent-less plastisols containing primary plasticizers.

U.S. Pat. No. 7,872,063 to Strepka et al. describes a film-forming composition, such as a polish, coating, adhesive or ink, comprising at least one acrylic or vinyl acetate polymer as the film-forming component in combination with a plasticizer blend comprising an aromatic dibenzoate, DEGDB and DEGMB.

U.S. Pat. No. 7,629,413 to Godwin et al. describes a PVC plastisol composition comprising C9-C11 alkyl benzoates in combination with phthalate plasticizers to reduce viscosity and reduce staining problems associated with the phthalates.

U.S. Pat. No. 8,034,860 to Arendt et al. describes an organosol plastisol composition comprising plasticizers that are diesters of benzoic acid and dihydric alcohols in combination with an organic diluent. Monoesters of benzoic acid and monohydric alcohols are also described as auxiliary plasticizers.

U.S. Pat. Publication No. 2009/0036581 to Joshi et al. describes plasticizers for polymers based on blends of the mono- and di-benzoates of 2,2,4-trimethyl-1,3-pentanediol, containing a minimum of 87 weight percent of the dibenzoate, which can be used in combination with dipropylene glycol benzoates.

In sum, benzoate esters, including DPGDB and DEGDB blends, have been used in many applications. Dibenzoate plasticizers provide improved processability, fast fusion and stain resistance, among other properties that are favorable for many polymer applications.

The focus of the present invention is on non-phthalate, high solvator plasticizer compositions, since general purpose phthalate plasticizers—although widely used, effective and economical in vinyl—are not efficient solvators. Moreover, the use of phthalates has been under increased attack by governmental agencies due to environmental, health and safety issues associated with their use. And, while the specialty phthalate plasticizer butylbenzyl phthalate (BBP) was widely regarded as the holy grail of plasticizers in that it was an excellent (high) solvator with low viscosity and a desirable rheology profile, it, too, has now come into disfavor as a potential teratogen and toxin.

Accordingly, there continues to be a need for alternatives to currently available high solvating phthalate plasticizers and, hence, benzoate plasticizers and blends thereof are viable alternatives due to their high solvating properties.

Of particular interest in the present invention are dibenzoate plasticizers, which, as discussed above, have been known and used for their high solvating properties in a variety of applications. Even so, dibenzoate use in plastisols may be limited by high plastisol viscosity and undesirable rheology over time as the plasticizer continues to solvate. As the plastisol composition ages, it is rendered more and more viscous. In addition, high solvator plasticizers may be less heat and UV light stable. They are also denser than general purpose plasticizers and have a higher migration than general purpose types when used in polymeric products, such as plastisols.

These limitations are described in the '860 to Arendt et al. mentioned above. The '860 patent describes a plastisol comprising a dispersed polymer and a DEG/DPG dibenzoate blend that resulted in a 25-fold increase in plastisol viscosity, which was far too viscous for processing using conventional equipment. The publication further discloses a plastisol composition comprising a dispersed polymer, dibenzoate plasticizers (among others) and an organic diluent (solvent), wherein viscosity increase was avoided or reduced by selecting and matching components based upon specific differences between a) the Hildebrand solubility parameter of the polymer and b) the weighted average of the Hildebrand solubility parameters of the organic diluent (solvent), plasticizers and any other liquid ingredients present in the plastisol. The difference between a and b is required to be within specified limits to avoid too high a plastisol viscosity on the one hand, or the possibility of exudation of liquids from articles formed from the plastisol on the other hand. The plasticizer was selected from the group consisting of diesters of benzoic acid and dihydric alcohols, such as propylene glycol, and oligomeric ether glycols, such as diethylene glycol, triethylene glycol, dipropylene glycol and 1,3-butanediol, as well as diesters of phthalic acid and monohydric alcohols.

In response to continued needs in the PVC industry, a new dibenzoate triblend platform has been developed which can been optimized for performance and handling in polymeric compositions, and which provides an improvement over some traditional benzoate plasticizers and blends, in particular with respect to plastisol rheology. The novel blend comprises three dibenzoate plasticizers that have surprisingly fewer viscosity limitations than would be expected based on the viscosities of the individual components. A blend of dibenzoate plasticizers, i.e., DEGDB and DPGDB in specified ratios, forms the base of the inventive plasticizer triblend in combination with 1,2-propylene glycol dibenzoates (PGDB). 1,2-Propylene glycol dibenzoate is a known component previously used alone with PVC or in plasticizer blends unrelated to the present inventive triblend. 1,2-Propylene glycol dibenzoate was also known as a flavoring agent for beverages as described in U.S. Pat. No. 3,652,291 to Bedoukian.

The inventive triblend is useful as a high solvating plasticizer in plastisol applications and, unexpectedly, the combination provides lower viscosity and improved rheology characteristics in plastisols over what would be expected based on the rheological characteristics of each of the individual components of the triblend. The novel triblend is compatible and efficient when used in plastisol formulations and provides improved processability, whether used as a primary plasticizer or as a blending plasticizer in conjunction with poor solvating plasticizers. The novel triblend of DPGDB, DEGDB, and PGDB has not been utilized in the past.

The focus of the present invention is on the use of the inventive blend to formulate novel plastisol compositions for use in flooring applications. However, the invention is not limited to flooring applications. The inventive plasticizer triblend can be used individually and in blends with other plasticizers in applications that include but are not limited to: adhesives, caulks, architectural coatings, industrial coatings, OEM coatings, other types of plastisols, sealants, overprint varnishes, polishes, inks, melt compounded vinyl, polysulfides, polyurethanes, epoxies, styrenated acrylics and combinations thereof. Other applications will be evident to one skilled in the art based upon the disclosure herein.

Principle applications for the inventive triblend include:

PVC: the inventive triblend has been shown to be a high solvating plasticizer, with unexpectedly lower viscosity than what would be expected based upon the viscosities of the individual components.

Coatings: the inventive triblend has been shown to have utility in coating technology, primarily as a low VOC coalescent, that has excellent compatibility with the polymers utilized in the architectural and industrial coatings industry. This application is the subject of a co-pending application. The inventive triblend may also be used in other coatings and film-forming compositions, such as polishes, inks and overprint varnishes, among others.

Adhesives: the inventive triblend is highly compatible and has good viscosity response and Tg (glass transition temperature) suppression.

Sealants and Caulks.

It is an object of the invention to provide a non-phthalate plasticizer composition for use as a primary plasticizer or as a specialty plasticizer in polymeric compositions traditionally requiring plasticizers, including without limitation PVC applications.

It is another object of the invention to provide a non-phthalate plasticizer composition that is compatible with a wide range of polymeric compositions, has high solvating properties, and is useful as a specialty blending plasticizer to improve the compatibility and processability of poor solvating plasticizers.

It is yet another object of the invention to provide a non-phthalate plasticizer composition for use in plastisols, having high solvating properties, while minimizing the attendant disadvantages of high viscosity and poor rheology associated with the use of high solvators in plastisols.

It is a further object of the invention to provide a plastisol formulation utilizing a non-phthalate plasticizer, which allows faster processing and economic efficiencies to be achieved.

It is yet another object of the invention to provide a plastisol formulation utilizing a non-phthalate plasticizer, which provides higher tensile strength and stain and extraction resistance.

Still further objects of the invention are to provide an adhesive formulation and an overprint varnish utilizing the non-phthalate plasticizer triblend of the invention.

Other objects of the invention will be apparent from the description herein.

SUMMARY OF THE INVENTION

Plasticizer blends of the present invention comprise unique blends of three dibenzoate esters: diethylene glycol dibenzoate (DEGDB), dipropylene glycol dibenzoate (DPGDB), and 1,2-propylene glycol dibenzoate (PGDB). These plasticizers are compatible with each other and with various polymers such as elastomers, thermoplastics, and thermosets; such as, for example, polyvinyl chloride and copolymers thereof; various polyurethanes and copolymers thereof; various polysulfides; various polyacrylates and copolymers thereof; various polysulfides and copolymers thereof; various epoxies and copolymers thereof; and vinyl acetate and copolymers thereof.

The inventive plasticizer triblend functions in PVC applications as a high solvator, but with unexpectedly lower viscosity and improved rheology characteristics than would be expected based upon the individual triblend components alone.

In one embodiment, the invention is directed to a novel plastisol composition, comprising a polymer dispersed in a liquid phase consisting of the inventive triblend, wherein the viscosity of the plastisol is lower than that which would have been expected with the use of PGDB blended with a 4:1 DEGDB/DPGDB blend.

In another embodiment, the invention is directed to an adhesive composition comprising a polymer dispersed in a liquid phase consisting of the inventive triblend, wherein the Tg of the adhesive is unexpectedly lower than that achieved with PGDB alone and similar to that achieved with the 4:1 DEGDB/DPGDB blend. The inventive plasticizer triblend is more efficient than PGDB alone in softening the adhesive polymer resulting in efficiencies in manufacturing and reduced costs.

In yet another embodiment, the invention is directed to a traditional coating composition comprising a polymer dispersed in a liquid phase consisting of the inventive triblend, wherein the VOC content of the coating is substantially reduced as compared to other conventional coalescents and plasticizers.

In still a further embodiment, the invention is directed to a screen ink or an overprint varnish composition comprising a polymer dispersed in a liquid phase consisting of the inventive triblend.

The improved properties attributable to the use of the plasticizer triblend described herein include efficient Tg suppression (for adhesives), faster processing time than that achieved with general purpose types of plasticizers, reduced plasticizer freeze point, low gelation and fusion temperatures, low VOC content, unexpectedly lower application viscosity, higher tensile strength than that achieved with general purpose phthalates, and excellent stain and extraction resistance.

DETAILED DESCRIPTION OF THE INVENTION

Figure 1:
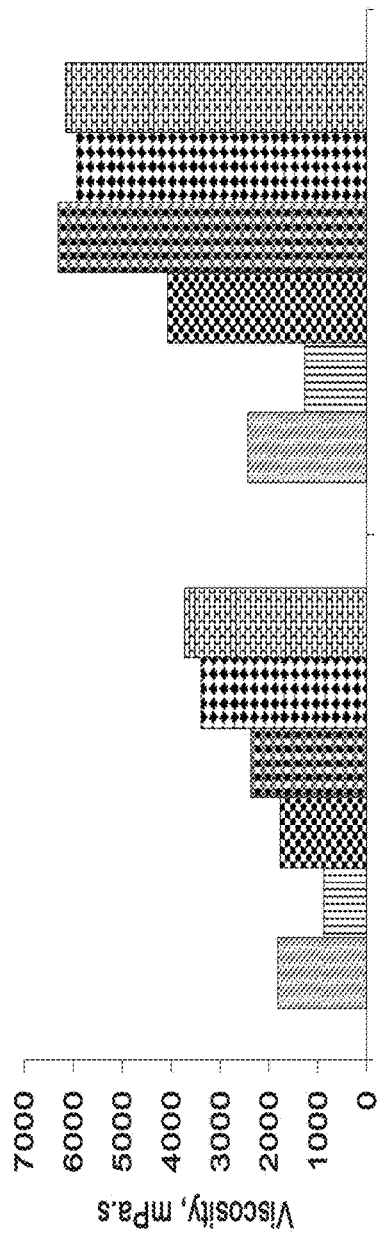
FIG. 1 is a chart reflecting Brookfield Viscosity, 20 RPM, 23° C. for the inventive triblend as compared to DINP, DIDC or DINCH®, BBP, a dibenzoate diblend (DEGDB/DPGDB), and PGDB.
Figure 1A:
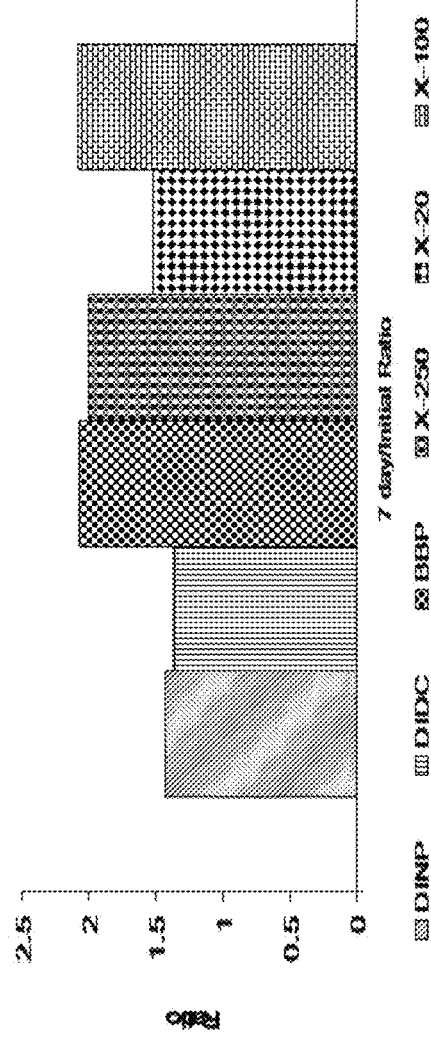
FIG. 1A is a chart reflecting the 7 day/initial viscosity ratios for the inventive triblend as compared to DINP, DIDC, BBP, a dibenzoate diblend, and PGDB.

The present invention is directed to a new blend of three plasticizers: DEGDB, DPGDB and 1,2-propylene glycol dibenzoate (PGDB), in the amounts and/or ratios discussed herein. The plasticizers of the present invention can generally be utilized with numerous thermoplastic, thermoset, or elastomeric polymers often as an alternative for conventional plasticizers. In particular, the inventive triblend may be used to prepare a reduced viscosity PVC or acrylic plastisol in accordance with the present invention.

In addition to PVC and acrylic plastisols, the inventive triblend may be useful in other polymeric compositions, including but not limited to various vinyl polymers such as polyvinyl chloride and copolymers thereof, vinyl acetate, vinylidene chloride, diethyl fumarate, diethyl maleate, or polyvinyl butyral; various polyurethanes and copolymers thereof; various polysulfides; cellulose nitrate; polyvinyl acetate and copolymers thereof; and various polyacrylates and copolymers thereof.

Acrylic polymer compositions for various applications may also be used with the inventive triblend and include various polyalkyl methacrylates, such as methyl methacrylate, ethyl methacrylate, butyl methacrylate, cyclohexyl methacrylate, or allyl methacrylate; or various aromatic methacrylates, such as benzyl methacrylate; or various alkyl acrylates, such as methyl acrylate, ethyl acrylate, butyl acrylate, or 2-ethylhexyl acrylate; or various acrylic acids, such as methacrylic acid and styrenated acrylics.

Other polymers for which the inventive triblend may be useful as a plasticizer include epoxies, phenol-formaldehyde types; melamines; and the like. Still other polymers will be evident to one skilled in the art.

For purposes of the invention, "plastisol" means a liquid polymer composition comprising a particulate form of at least one non-crosslinked organic polymer dispersed in a liquid phase comprising a plasticizer for the polymer. The present invention is not restricted to any particular polymer, although the invention may be described in terms of vinyl polymers.

As used herein, "organosol" means a plastisol comprising, in addition to the plasticizer, a liquid hydrocarbon, ketones, or other organic liquids to achieve desired processing viscosity in amounts greater than about 5 wt. %.

As used herein, "high solvator" or "high solvating" is a term that describes the plasticizer's efficiency in penetrating and softening a polymer, "higher" solvators softening the polymer faster, thus facilitating the formation of a homogenous phase.

The preferred dibenzoates of the invention are DEGDB, DPGDB, and 1,2-propylene glycol dibenzoate (PGDB). PGDB was previously known for use as a high solvating plasticizer for vinyl compositions alone or in combination with other plasticizing materials not related to the invention disclosed herein. Use of PGDB (defined as 1,2-propylene glycol dibenzoate) in the inventive dibenzoate triblend is key, since use of other propylene glycol dibenzoates do not provide the lower freeze point discussed below.

One feature of the inventive plasticizer triblend is a lower freeze point than some currently available commercial dibenzoate blends containing DEGDB. Almost all newer commercial dibenzoate blends contain DEGDB as a base for the blend due to excellent solvating characteristics and the drive for cost savings. However, pure DEGDB freezes above normal room temperature (28° C.), thus hampering its use. The freeze point of the inventive triblend (initial onset of freezing) as compared to currently available typical dibenzoate blends are as follows:
 Inventive triblend: +6° C.
 typical dibenzoate diblend: +12° C.

Handling dibenzoate blends containing DEGDB can be an issued compared to typical plasticizers such as phthalate esters. As such, the lower freeze point achieved by the inventive triblend provides a distinct advantage over currently available dibenzoate blends.

While not wishing to be bound by any particular theory, it is believed that the addition of PGDB to the DEGDB/DPGDB blend lowers the freezing point considerably (from −12° C. to −6° C.), which provides considerable advantages in cold weather handling for which some dibenzoates and blends were not previously considered.

The amounts of the individual plasticizers in the inventive blends can vary broadly depending on end use and properties desired. Thus, for the triblend, the amount of DEGDB can vary from about 10% to about 90% by weight based upon the total weight of the triblend composition, but preferably is present in amounts greater than about 60% by weight. Higher amounts of DEGDB than either of the other two plasticizers are preferred due to cost considerations, DEGDB being far less expensive than PGDB and DPGDB. The amount of DPGDB can generally vary from about 1% to about 50% by weight based upon the total weight of the triblend, but preferably is present in amounts greater than about 15%. The amount of PGDB can vary broadly such as from about 10% to about 90% by weight based upon the total weight of the dibenzoate triblend, but preferably is present at about 20 wt. %. PGDB is also lower in cost than DPGDB.

One preferred embodiment is shown below:
 a. 1,2-PGDB 20 wt. %
 b. DEGDB/DPGDB 80/20 80 wt. %

The triblend can be prepared in any conventional manner known to one skilled in the art, including by simply blending the three components together, or by forming them together in situ.

DPGDB is commercially available as K-FLEX® DP made by Emerald Kalama Chemical, UNIPLEX® 988 made by Unitex Chemical Corp., SANTICIZER® 9100 made by Ferro, and FINSOLV® PG-22 made by Finetex, Inc. DEGDB is commercially available as K-FLEX® DE, and UNIPLEX® 245. PGDB is commercially available as UNIPLEX® 284, and has been manufactured in the past as K-FLEX® MP.

The inventive triblend can be utilized with numerous different types of polymers and in different applications that require plasticizers. The total amount of the dibenzoate triblend, for example, would range broadly depending on the application, generally from about 1 to about 300, desirably from about 10 to about 100, and preferably from about 20 to about 80 parts by weight for every 100 total parts by weight of the one or more thermoplastic, thermoset, or elastomeric polymers, including without limitation those identified above. A particularly preferred embodiment for a plastisol includes 70 parts by weight of plasticizer for every 100 total parts by weight of polymer(s) or roughly 40 wt. %.

The inventive triblend compositions can be utilized in coatings, depending on the nature of the coating, in amounts up to about 20% of the polymer solids in the system.

The inventive triblend can be utilized in aqueous adhesives in amounts up to about 50 wt. %, based upon the total weight of the adhesive.

The inventive triblend can be utilized in overprint varnishes in amounts up to about 20 wt. %, based upon the total weight of the overprint varnish.

The inventive triblend may be, but is not required to be, blended with various other conventional plasticizers to enhance or augment properties of polymeric compositions, including but not limited to improving compatibility and processability in a plastisol. Conventional plasticizers include, but are not limited to, various phthalate esters, various phosphate esters, various adipate, azelate, oleate, succinate and sebacate compounds, terephthalate esters such as DOTP, 1,2-cyclohexane dicarboxylate esters, various epoxy plasticizers, various fatty acid esters, various glycol derivatives, various sulfonamides, and various hydrocarbons and hydrocarbon derivatives that are often utilized as secondary plasticizers. Monobenzoates, such as isononyl benzoate, isodecyl benzoate, 2-ethylhexyl benzoate, and 2,2,4-trimethyl-1,3-pentanediol diisobutyrate can also be blended with the inventive triblend. In particular, the inventive triblend is useful as a blending plasticizer for addition to poorer solvating plasticizers, such as DIDC and DOTP among others, to improve compatibility and processability in plastisol applications.

The inventive triblend may also contain various amounts of conventional additives such as antioxidants, heat stabilizers, flame retardants, surfactants and the like. Additives amounts can generally vary widely and often range from about 0.1 to about 75 parts by weight for every 100 parts by weight of the blend.

The dibenzoate blends of the present invention can be utilized wherever conventional plasticizers are currently used. Desirably, they are utilized in adhesives, caulks, architectural and industrial coatings, plastisols, overprint varnishes, inks, melt compounded vinyl, polysulfides, polyurethanes, epoxies, or any combinations thereof. Other uses will be evident to those skilled in the art.

The invention is further described in the examples below.

EXAMPLES

Experimental Methodology

Plastisol and Vinyl Preparation

The plastisols made for the basic screen were prepared in a Hobart Model N-50 mixer. A ten minute mix at speed one (1) was used. A high speed disperser was also used to prepare other plastisols evaluated employing a ten minute mix at 1000 RPM's. All of the plastisols were degassed at 1 mmHg until as completely air free as possible.

The vinyl for the basic screen was fused in a closed mold at a thickness of 1.2 mm at 177° C. for 15 minutes in a Blue M oven. Vinyl for the stain testing was fused in a Mathis oven at a thickness of 0.5 mm at 204° C. for 2.5 minutes. The air flow was set at 1500 RPM's.

Tests/Evaluations

Unless otherwise indicated in specific examples, the general tests and/or methodologies described below were used in evaluating the performance of the inventive plasticizers in comparison to currently available plasticizers. The tests and methods are known to one skilled in the art.

Ability to Degas—After mixing the plastisol, degree and ease of degassing was determined. About ten milliliters were placed in a vacuum cylinder and a 1 mmHg vacuum was applied. Height of the rise in mL was divided by the starting volume and that value was reported. The time to foam break was noted.

Viscosity and Rheology: Low shear—Brookfield RVT, 20 RPM's, 10 revolution reading. ASTM D1823. High shear—TA AR2000ex used. Parallel plates were set at appropriate gap (350 microns). Shear to 1000 sec$^{-1}$.

Gel/Fusion: TA AR2000ex in oscillatory mode. Parallel plates were set at appropriate gap (600 microns). The test temperature was started at 40° C. and heated at a rate of 5° C./minute to 220° C.

Gel temperature—Hot bench type test wherein a thin bead of a plastisol was applied to a temperature gradient plate and after three minutes cuts were made across the bead. The temperature at which the cut in the plastisol did not re-fuse was the gel temperature, i.e., the plastisol was "gelled."

Compatibility: Loop—ASTM D3291. Roll—a tight loop of vinyl was rolled with absorbent paper, then placed in an oven at 60° C. for three days. Compatibility was judged on degree of exudation in sum.

Efficiency—Shore A—ASTM D2240; Tensile—ASTM D638, type IV die, 50.8 cm/minute pull rate.

Permanence—Extraction resistance, ASTM 01239. Extractants—Peanut oil (24 hour exposure at RT); 1% IVORY soap solution (24 hours at 50° C. and 4 hours dry at 50° C.); heptane at RT (24 hours, 4 hours dry at 50° C.). Activated charcoal volatility, ASTM 01203 was evaluated at 1, 3, 7, 14, 21, and 28 days.

Heat stability testing was conducted in a Mathis oven at 195° C. with a blower speed of 1500 RPM's at the test intervals indicated. The time to first yellowing and to brown were noted.

Stain testing: A 1% solution of oil brown dye dissolved in mineral spirits was used as the staining agent. The staining agent was applied to the vinyl and held in place with a tissue for 30 minutes. The stain was wiped from the vinyl, the vinyl was wiped clean with mineral spirits, and pictures were taken to record results.

Examples 1-6

For examples 1-6, the inventive triblend dibenzoate plasticizer (X20), comprising 20 wt. % 1,2-propylene glycol dibenzoate and 80 wt. % of an 80/20 DEG/DPG dibenzoate blend, was evaluated to determine basic performance parameters versus standard controls, to facilitate formulation directions. Controls used in examples 1-6 evaluations included butylbenzyl phthalate (BBP), diisononyl phthalate (DINP), and diisononyl-1,2-cyclohexane dicarboxylate (DIDC). Also separately evaluated, in addition to the inventive triblend, were a DEGDB/DPGDB diblend plasticizer (X250; 4:1 DEG dibenzoate:DPG dibenzoate ratio) and PGDB (X100>98%), both of which are components of the inventive triblend.

Tests conducted in examples 1-6 include: compatibility (loop and roll spew); efficiency (Shore A, tensile properties); permanence (extraction and volatility); and processability (viscosity, viscosity stability, shear rate/rheology and gel/fusion).

The basic plastisol formulation evaluated in examples 1-6 is shown in Table 1, below:

TABLE 1

| Basic Plastisol Formulation | |
|---|---|
| Material | PHR |
| Dispersion Resin, K76 | 100 |
| Plasticizer | 70 |
| Ca/Zn stabilizer | 3 |

The use of a basic plastisol formulation was to demonstrate interactions of plasticizers with PVC without interference from other additives, other than a required heat stabilizer.

Example 1—Brookfield Viscosity

Brookfield Viscosity tests showed an expected higher initial viscosity for the high solvating plasticizer individual components, i.e., the DEGDB/DPGDB diblend (X250) and the PGDB (X100) showed higher viscosity over all controls initially and at day 1. The 7 day/initial ratio was also higher for the X250 and X100 individual components over the DINP and DIDC controls, but not for BBP. It was expected that the viscosity of the triblend (X20), i.e., the combination of the DEGDB/DPGDB and PGDB, would be additive, i.e., somewhere between (based on the blend ratios) the individual components' viscosities. Unexpectedly, the 7 day/initial viscosity ratio was lower for the inventive triblend than for BBP, or either the DEGDB/DPGDB (X250) and PGDB (X100) component alone and comparable to that obtained for DINP and DIDC. The lower the ratio, the more stable the plasticizer viscosity. Generally, high solvators are not expected to have a lower ratio, but the inventive triblend did.

Example 2—One-Day Shear Rate Scan

Figure 2:
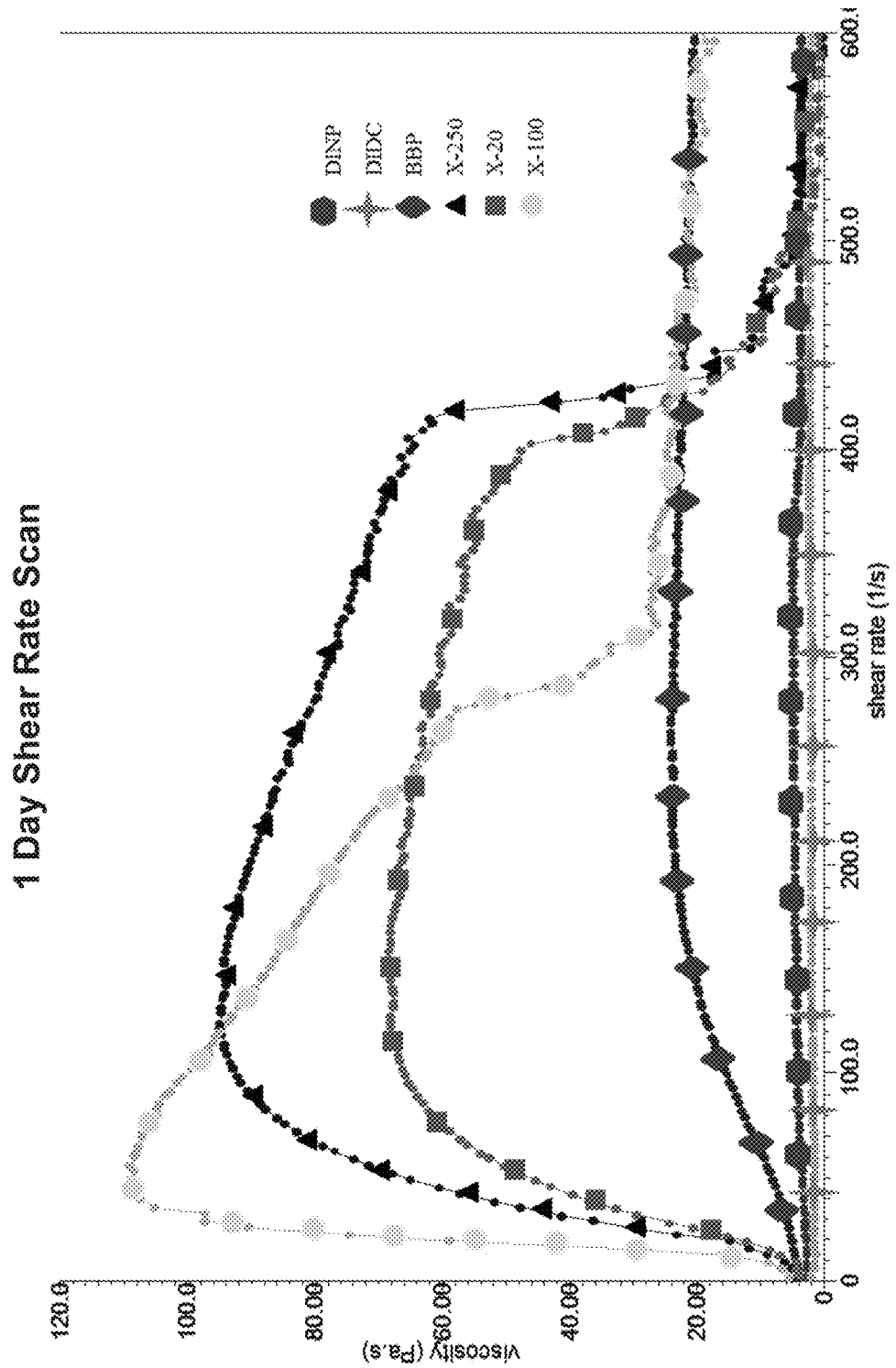
FIG. 2 is a 1-day shear rate scan (70 PHR) reflecting results obtained for the inventive triblend, DINP, DIDC, BBP, a dibenzoate diblend (DEGDB/DPGDB), and PGDB.

Results from the one-day shear rate scan (70 PHR) are shown in FIG. 2. As shear rate was increased, higher and higher viscosity was expected. For the controls, viscosity for DINP and DIDC remained level, while BBP increased slightly and leveled off. For the DEGDB/DPGDB (X250) and PGDB (X100), viscosity rose sharply and declined sharply for X100, while X250 rose slightly less sharply and declined modestly at higher shear rates. Again, unexpectedly, the 1-day shear rate scan for the triblend (X20) was better than that obtained for either component alone, (i.e., the DEGDB/DPGDB (X250) blend and the PGDB (X100)) and had a curve similar to BBP, albeit at a higher viscosity. Overall, PGDB (X100) had much poorer rheology as compared to the inventive triblend as reflected in FIG. 2.

Example 3—Gel/Fusion

Figure 3:
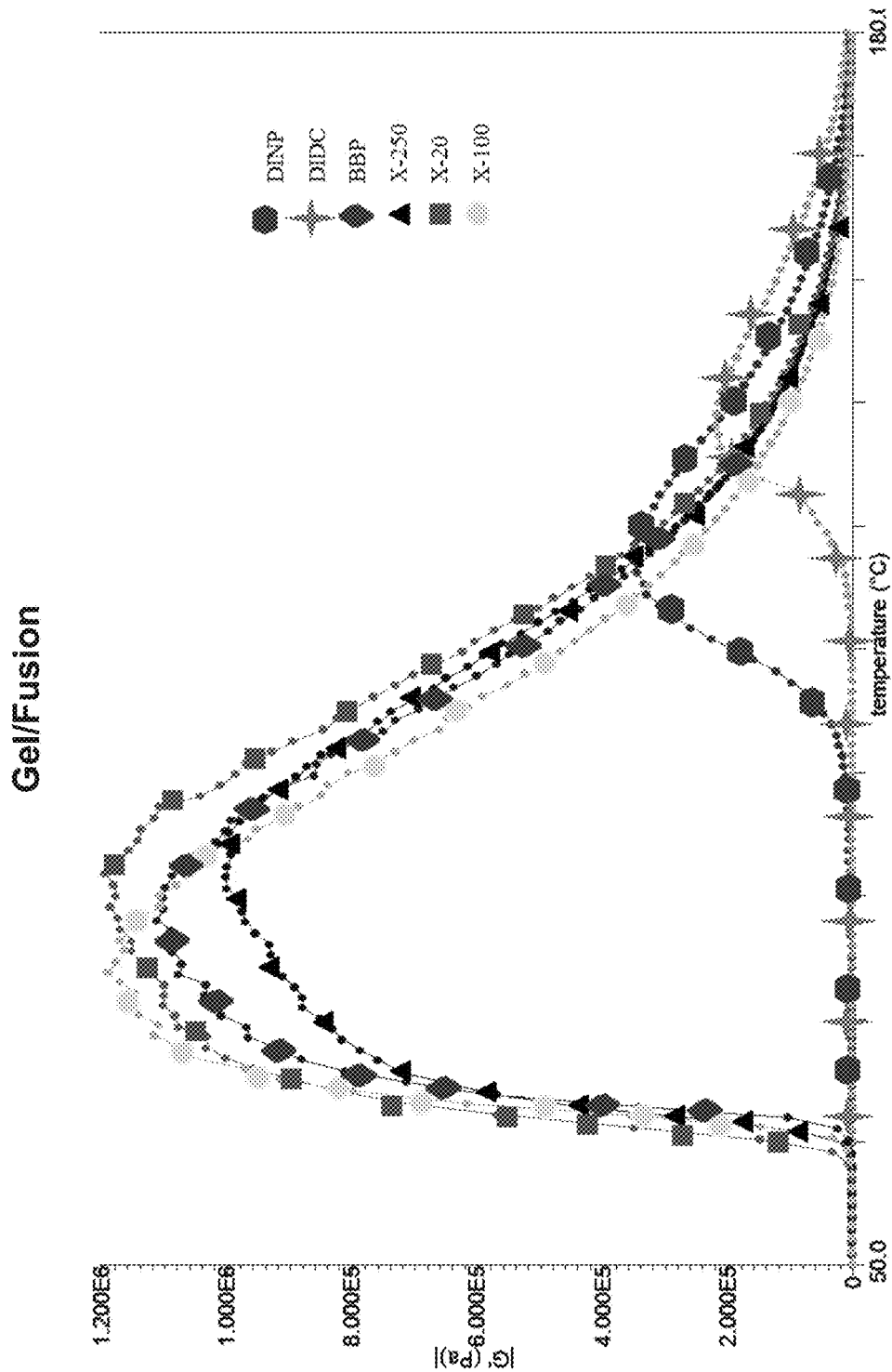
FIG. 3 is a graph reflecting gel/fusion curves for the inventive triblend, DINP, DIDC, BBP, a dibenzoate diblend (DEGDB/DPGDB), and PGDB.

Gel fusion data illustrates the relative solvation characteristics of various plasticizers. FIG. 3 and Table 2 show the results of the gel/fusion evaluation, which reflected comparable results for the individual components (X250 and X100) and the triblend (X20) as compared to the BBP control that is considered an industry standard. The results also showed that the novel triblend (X20) and PGDB (X100) were much better solvators than the DEGDB/DPGDB (X250) blend.

TABLE 2

Gel Fusion Data

| Plasticizer | Initial Inflection Temp (° C.) | G' Maximum Temp (° C.) | G' Maximum Modulus (Pa) | G' × G" Temp (° C.) |
|---|---|---|---|---|
| DINP | 79 | 125 | $3.5 \times 10^5$ | 177 |
| DIDC | 107 | 139 | $2.8 \times 10^5$ | 181 |
| BBP | 61 | 86 | $1.1 \times 10^6$ | 167 |
| X-250 diblend tailored to PVC industry (not inventive) | 59 | 91 | $1.0 \times 10^6$ | 168 |
| X-20 inventive triblend | 58 | 87 | $1.2 \times 10^6$ | 168 |
| X-100 propylene glycol dibenzoate | 59 | 82 | $1.2 \times 10^6$ | 164 |

Fused Vinyl Properties

Example 4—Compatibility Testing

A Loop test, ASTM D3291 was used to determine the compatibility of the plasticizers with PVC. The test temperature was 23° C. and evaluations were obtained after 1, 3 and 7 days. With the exception of DIDC, none of the plasticizers exhibited any exudation. All of the plasticizers were considered compatible using this test.

A Roll test was conducted on the plasticizers. The test temperature was 60° C. for 3 days, and evaluations were obtained after 1, 2 and 3 days. All plasticizers except DIDC were compatible by this test. DIDC exhibited heavy exudation.

Example 5—Efficiency Testing

Figure 4:
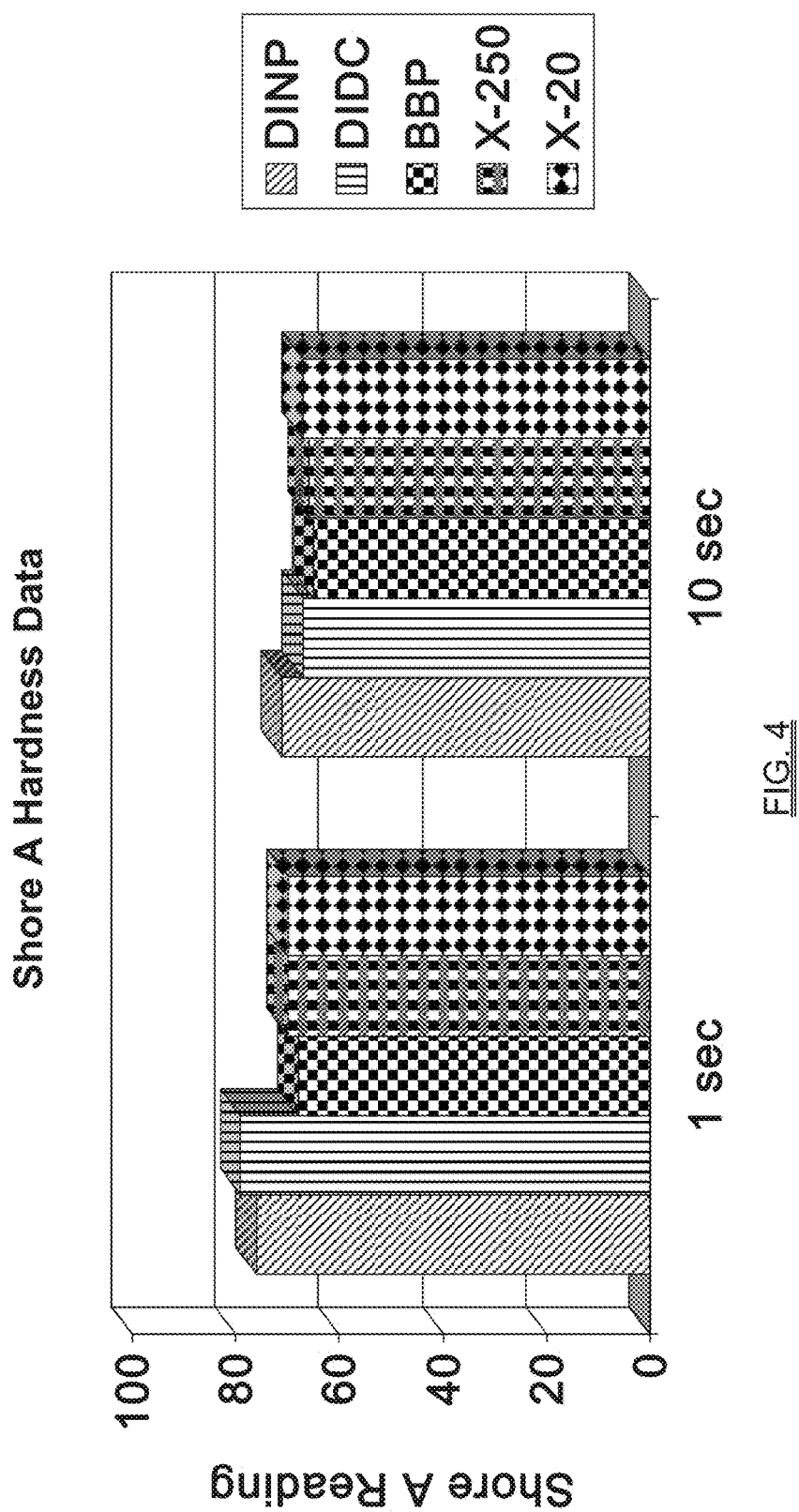
FIG. 4 is a chart reflecting Shore A Hardness Data for the inventive triblend, a dibenzoate diblend (DEGDB/DPGDB), DINP, DIDC, and BBP.

Shore A Hardness data were obtained at 1 second and 10 seconds for all controls (BBP, DINP and DIDC), the X250 diblend and the X20 triblend. The results are shown in FIG. 4 and show that the triblend (X20) and diblend (X250) were as efficient as the controls.

Figure 5:
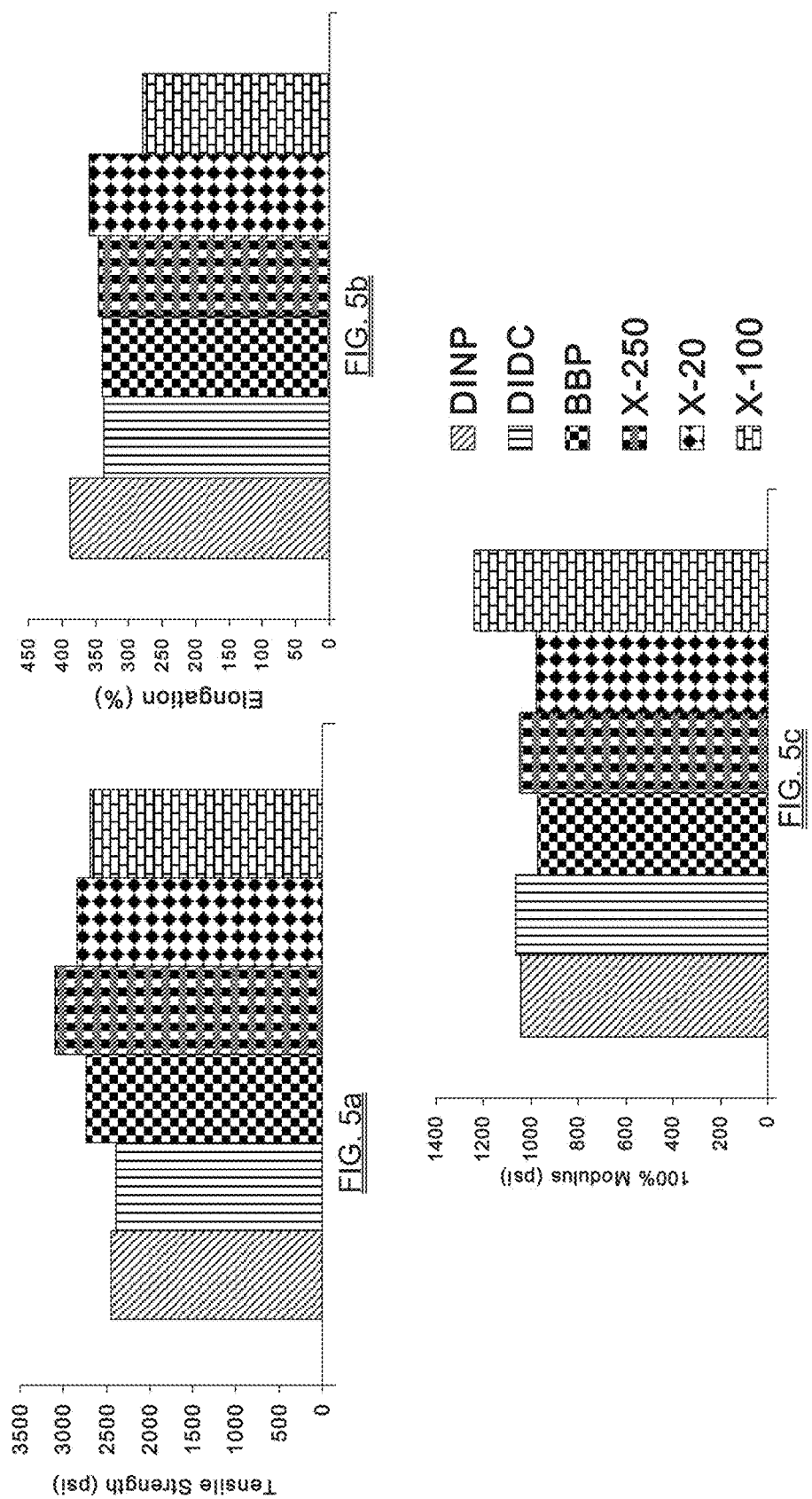
FIG. 5a is a chart reflecting tensile strength (psi) data for the inventive triblend, a dibenzoate diblend (DEGDB/DPGDB), PGDB, DINP, DIDC and BBP.
FIG. 5b is a chart reflecting elongation (%) data for the inventive triblend, a dibenzoate diblend (DEGDB/DPGDB), PGDB, DINP, DIDC and BBP.
FIG. 5c is a chart reflecting 100% modulus data for the inventive triblend, a dibenzoate diblend (DEGDB/DPGDB), PGDB, DINP, DIDC and BBP.

Tensile data obtained for the controls, the diblend (X250), PGDB (X100) and the triblend (X20) are shown in FIGS. 5a (Tensile at Break); 5b (% elongation); and 5c (100% modulus). The results show the X20 triblend exhibited superior elongation compared to the dibenzoate blend and most of the controls, as well as greater tensile strength compared to the controls.

Example 6—Permanence Testing

Figure 6:
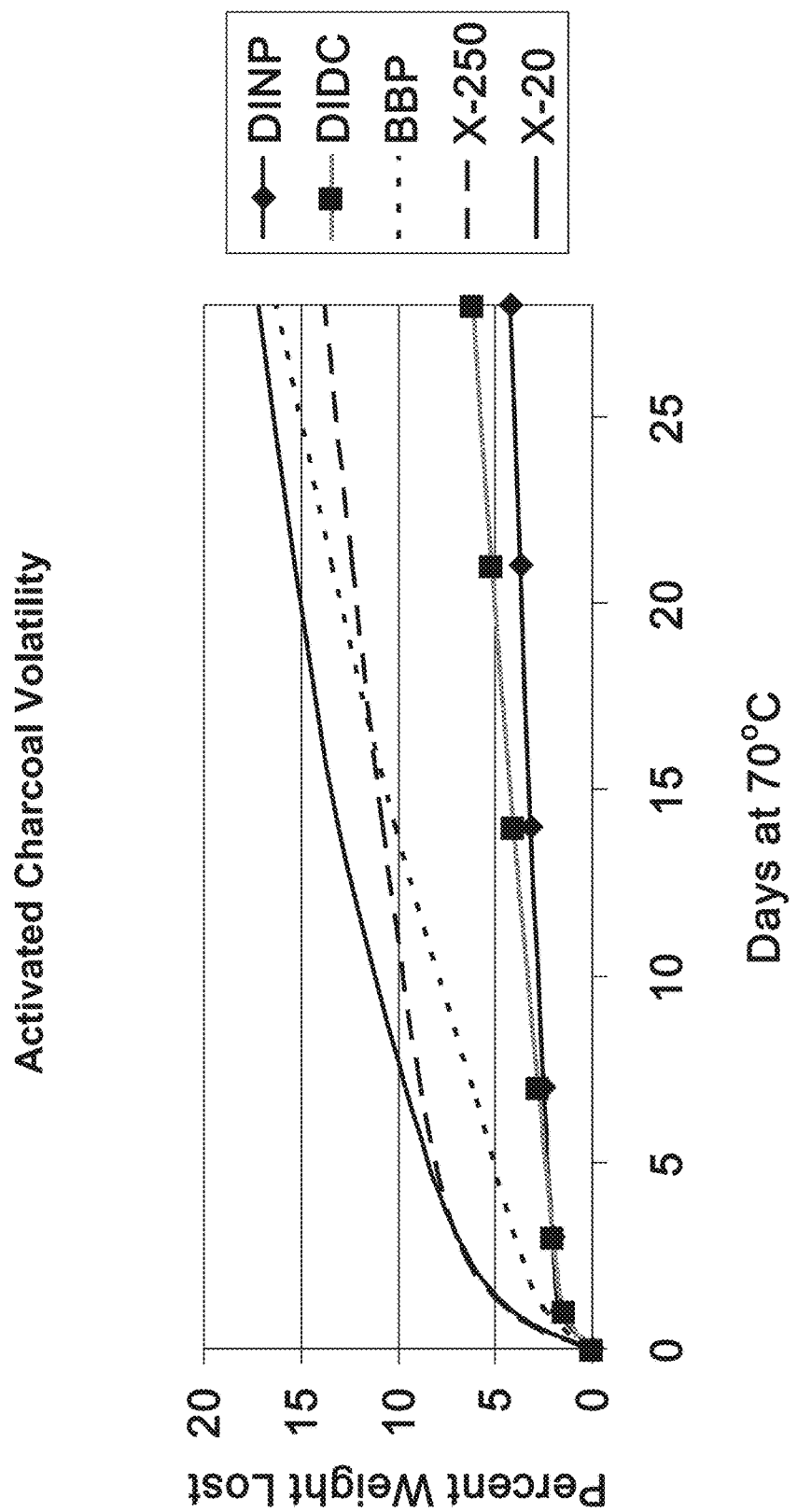
FIG. 6 is a graph reflecting volatility data for the inventive triblend, a dibenzoate diblend (DEGDB/DPGDB), DINP, DIDC and BBP.

Volatility data obtained for the controls, the diblend (X250) and the triblend (X20) are shown in FIG. 6. The results show that the X20 triblend has moderate volatility compared to the controls.

Figure 7:
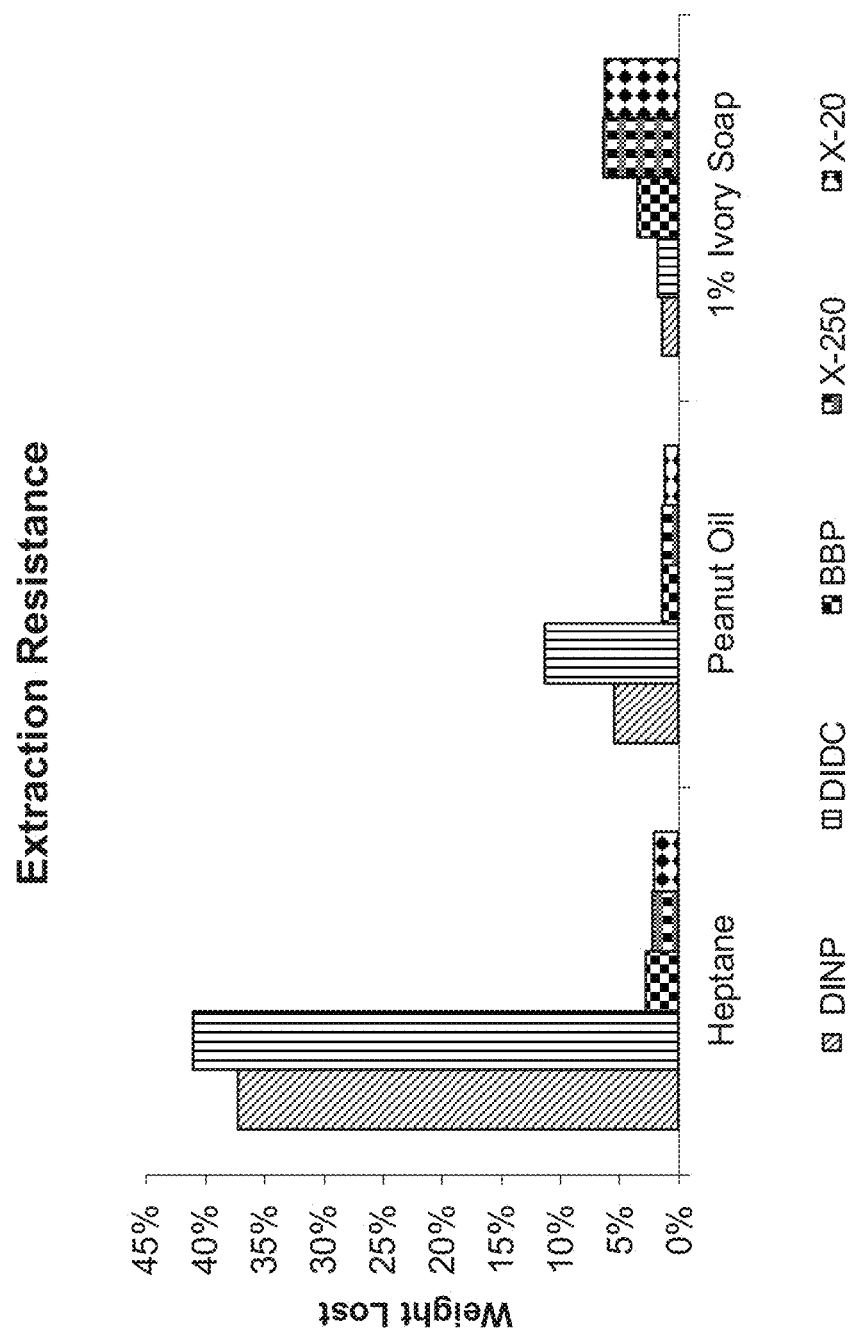
FIG. 7 is a chart reflecting extraction resistance data for the inventive triblend, a dibenzoate diblend (DEGDB/DPGDB), DINP, DIDC and BBP in heptane, peanut oil and 1% IVORY soap.

Extraction Resistance data in heptane, peanut oil and 1% IVORY Soap was obtained for the controls, the diblend (X250) and the triblend (X20) as shown in FIG. 7. The results show that the X20 triblend had superior extraction resistance versus the controls in both heptane and peanut oil. Although the extraction resistance of the triblend in IVORY Soap was poorer than the controls, it was still slightly better when compared to the diblend.

The results above demonstrated that the inventive triblend, like the dibenzoate diblend, is a high solvator with similar compatibility to the controls. In plastisols, both the inventive triblend and the diblend demonstrated dilatant flow and higher viscosities than general purpose plasticizer controls. Overall, the dibenzoate blends were more volatile than the general purpose plasticizers, but showed a better extraction resistance to solvents and oils. The dibenzoate blends showed much better fusion characteristics than general purpose plasticizers.

Example 7—Performance in a Spread Coating Type Formulation

Performance characteristics were also evaluated in a typical basic spread coating type formulation. The basic formulation is shown in Table 3, below.

TABLE 3

Typical Basic Spread Coating Type Formulation

| Raw Material | PHR |
|---|---|
| Dispersion Resin, K76 | 85 |
| Blending Resin | 15 |
| Plasticizer | 40 |
| 2,2,4-Trimethyl-1,3-pentanediol diisobutyrate | 10 |
| Solvent | 3 |
| Epoxidized Soybean Oil | 2 |
| Ca/Zn stabilizer | 3 |

Figure 8:
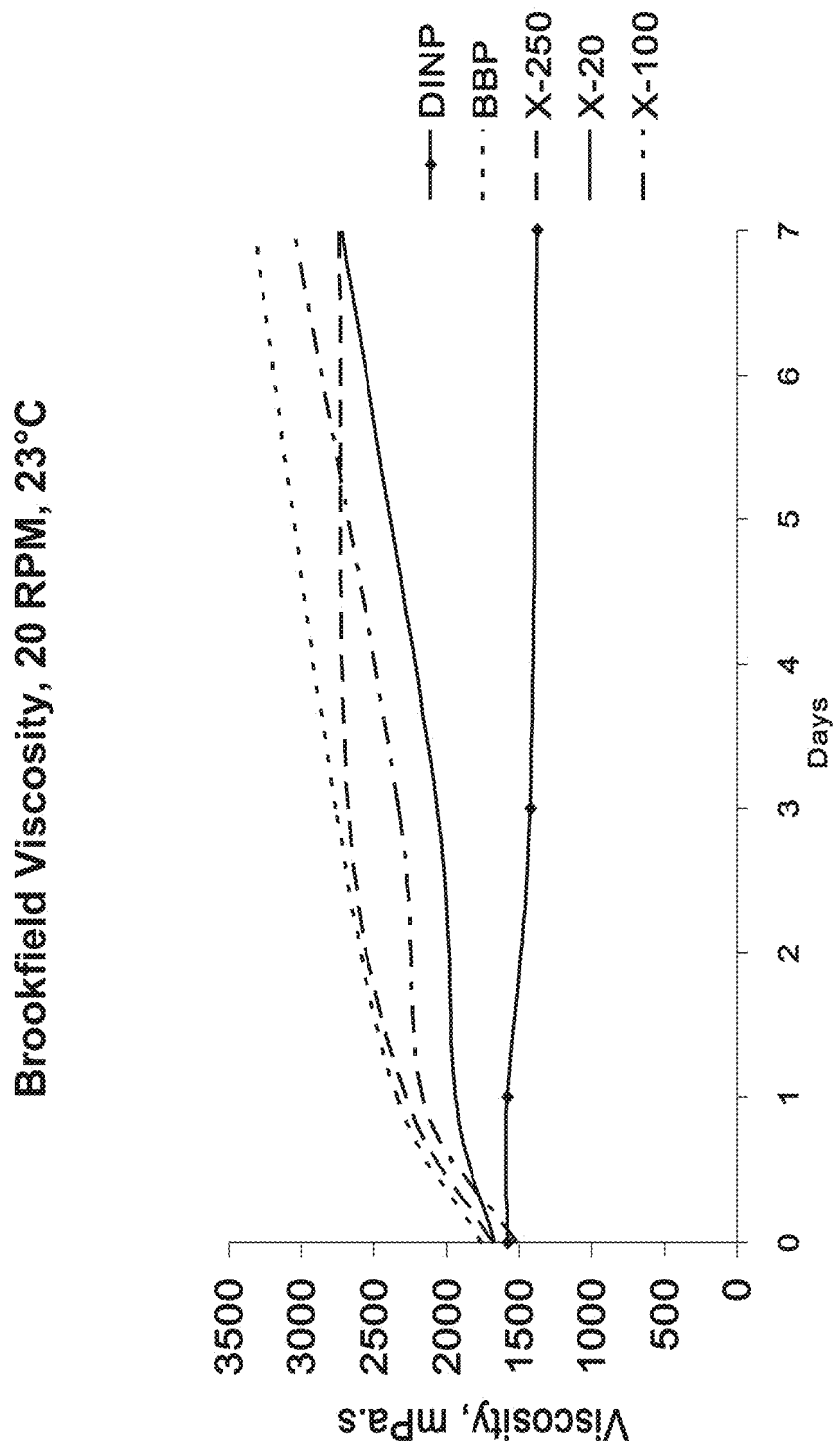
FIG. 8 is graph reflecting Brookfield Viscosities (mPa's) for a typical basic spread coating type formulation comprising the inventive triblend, a dibenzoate diblend (DEGDB/DPGDB), PGDB, DINP or BBP.
Figure 9:
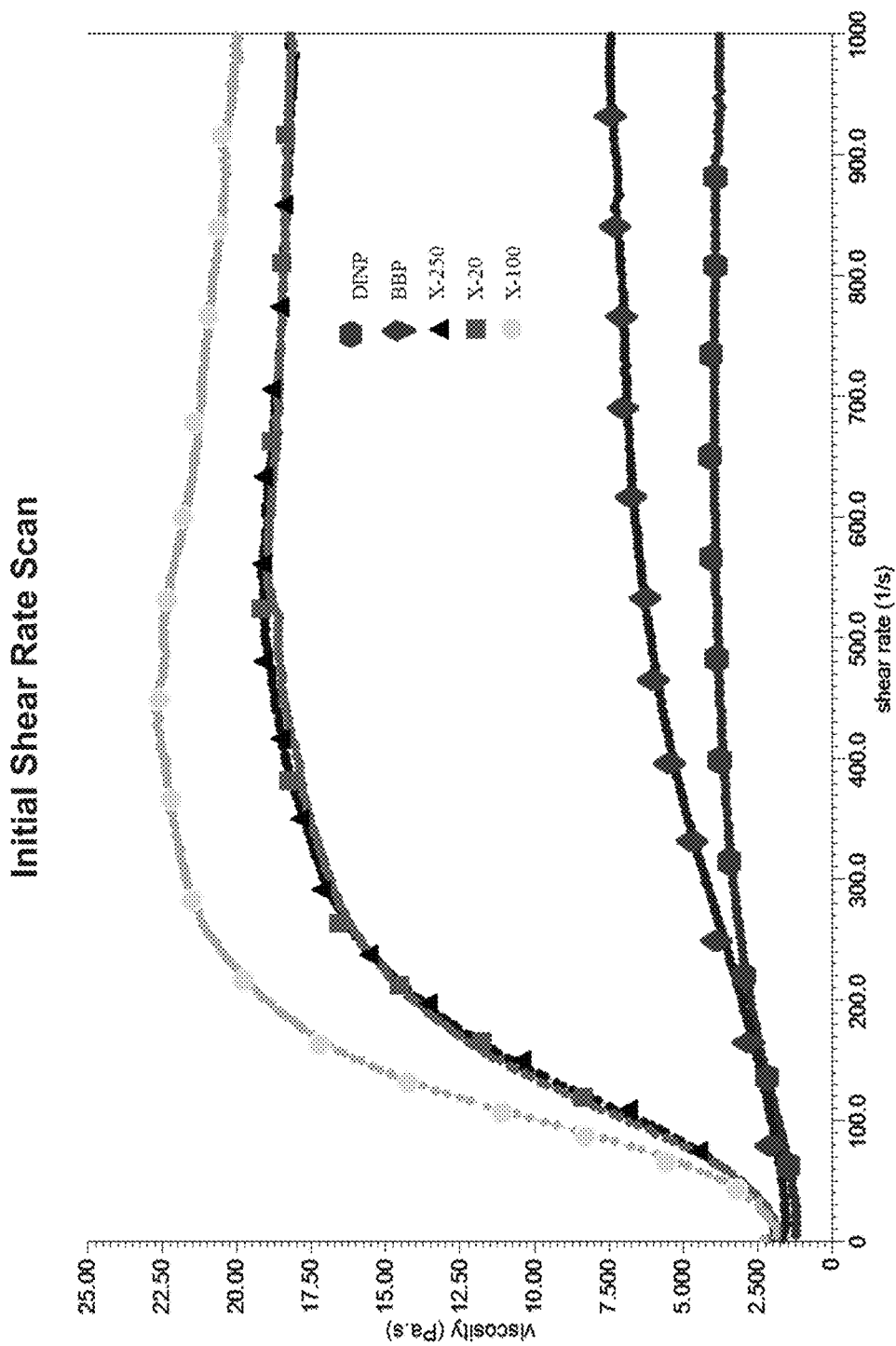
FIG. 9 is an initial shear rate scan reflecting viscosities (mPa's) over various shear rates (1/s) for a typical basic spread coating type formulation comprising the inventive triblend, a dibenzoate diblend (DEGDB/DPGDB), PGDB, DINP or BBP.
Figure 10:
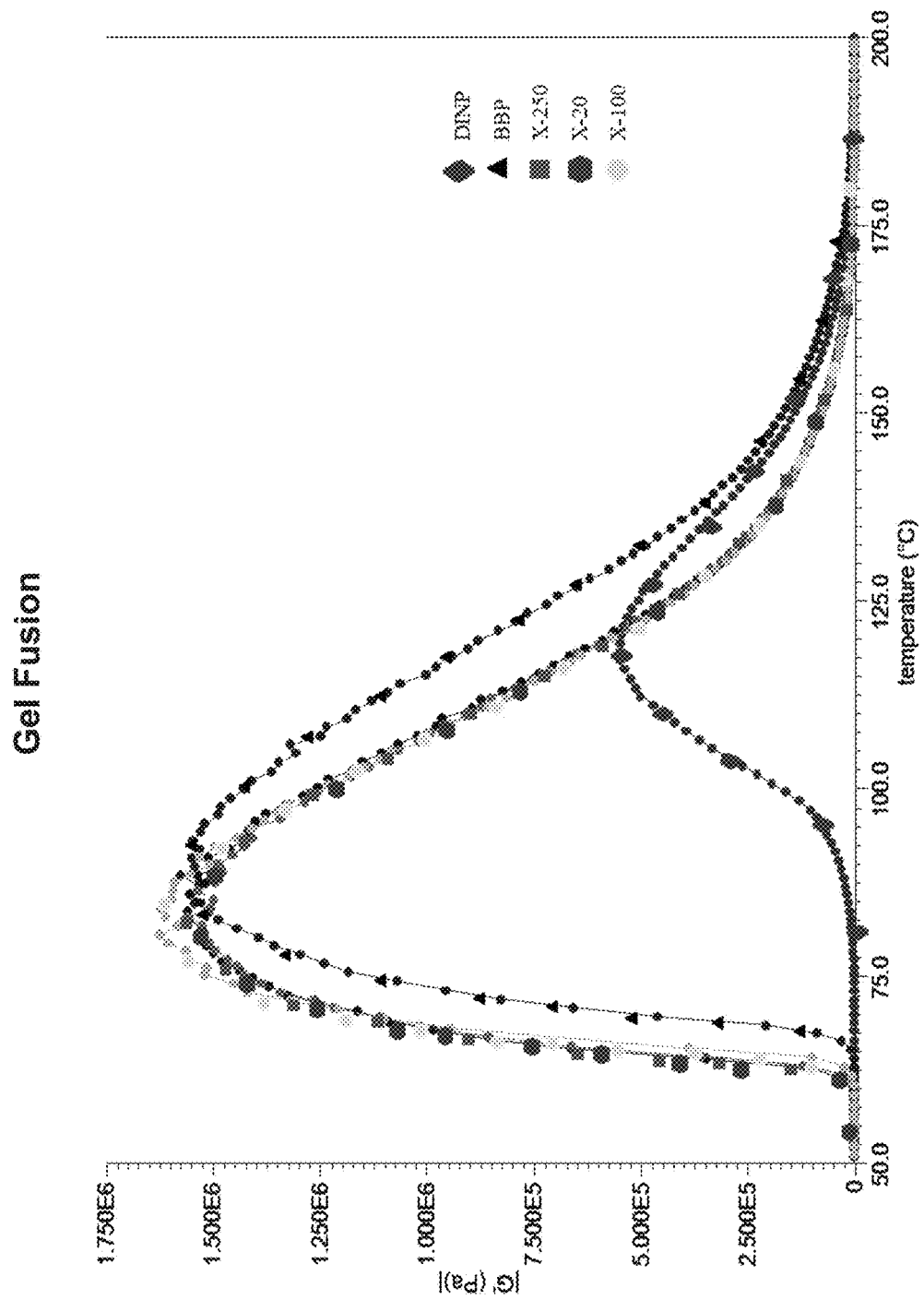
FIG. 10 is a graph reflecting gel/fusion curves for a typical basic spread coating type formulation comprising the inventive triblend, a dibenzoate diblend (DEGDB/DPGDB), PGDB, DINP or BBP.

Control plasticizers, DINP and BBP, were compared to the diblend (X250) and PGDB (X100) individual components and to the inventive triblend (X20). Results obtained for Brookfield Viscosity, Initial Shear Rate Scan, and Gel Fusion are shown in FIGS. 8, 9 and 10. The Gel Fusion data that was obtained is set forth in Table 4.

TABLE 4

| Plasticizer | Initial Inflection Temp (° C.) | G' Maximum Temp (° C.) | G' Maximum Modulus (Pa) | G' × G" Temp (° C.) |
|---|---|---|---|---|
| DINP | 80 | 118 | $5.5 \times 10^5$ | 177 |
| BBP | 63 | 88 | $1.6 \times 10^6$ | 182 |
| X-250 | 60 | 84 | $1.5 \times 10^6$ | 168 |
| X-20 | 61 | 83 | $1.5 \times 10^6$ | 169 |
| X-100 | 62 | 81 | $1.6 \times 10^6$ | 168 |

Example 8—Stain Resistance

Figure 11:
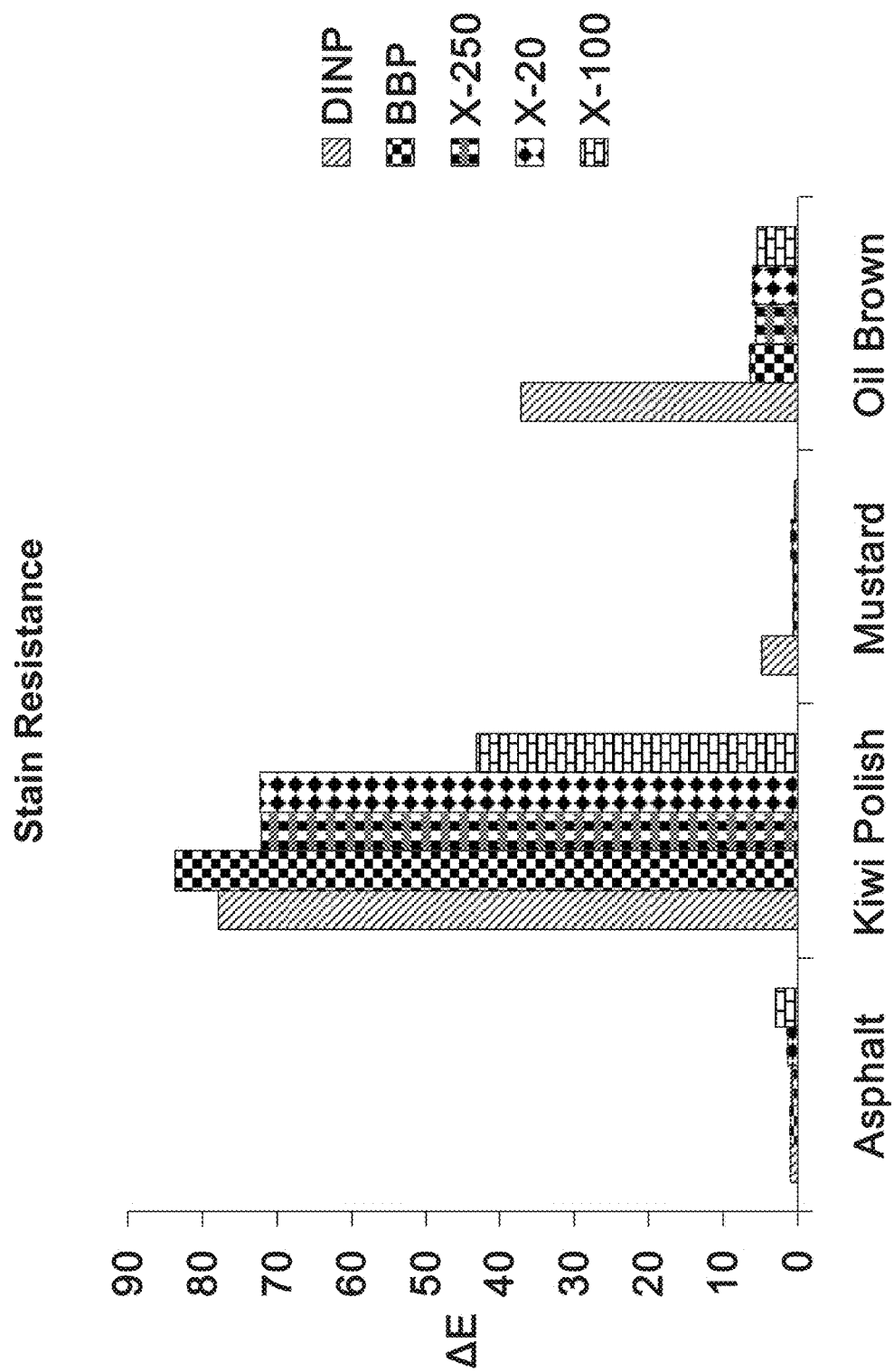
FIG. 11 is a chart reflecting stain resistance (ΔE) studies comparing the stain resistance of DINP, BBP, a dibenzoate diblend (DEGDB/DPGDB), PGDB, and the inventive triblend in the resilient flooring plastisol formulation using asphalt, KIWI® Brown Shoe polish, mustard and 1% Oil Brown stainants.

Stain resistance studies were conducted comparing the stain resistance of DINP, BBP, X250 (diblend), X100 (PGDB) and X20 (triblend) in the formulation of Table 3 to various stainants: asphalt, KIWI® Brown Shoe Polish, mustard, and 1% Oil Brown. Oil Brown is an industry standard used to simulate high traffic staining. All of the stainants, except for Oil Brown, were placed on the sample and left on for about two hours; the Oil Brown stainant was left on for 30 minutes. Stainants were then removed with clean mineral spirits. Color change was evaluated using delta E measurements (ΔE or dE), which shows numerically the differences between colors. The inventive triblend showed excellent stain resistance for asphalt, mustard and 1% Oil Brown. The inventive triblend was better than the controls for KIWI® Brown Shoe Polish. Stain resistance results are shown in FIG. 11.

Examples 9-11

The following plasticizers were evaluated in examples 9-11:

Diisononyl phthalate (DINP);
Butyl benzyl phthalate (BBP);
Di-2-ethylhexyl terephthalate (DOTP);
Diisononyl-1,2-cyclohexane dicarboxylate (DIDC);
Dibutyl terephthalate (DBTP);
N-C8-10 alkyl pyrrolidone (300);
X-20 inventive dibenzoate triblend;
X-250 dibenzoate diblend tailored to the PVC industry;
X-100 1,2 propylene glycol dibenzoate (98%).

In addition to evaluating basic performance data of the above plasticizers in a simple plastisol formulation, two other evaluations of the plasticizers were conducted—one in a flooring wear layer or typical spread coating starting formulation and the other in a starting formulation for plastisol screen ink. As above, the basic screen of the plastisol considered the four basic performance parameters: compatibility, efficiency, permanence and processability. The examples below identify basic characteristics used to demonstrate performance.

For the spread coating formula, viscosity, rheology, gel/fusion and staining were determined; and gel/fusion and rheology were determined for the plastisol screen ink formulation.

Table 5 below shows the simple plastisol formulation used to evaluate the plasticizers. Table 6 below shows the spread coating formula used to evaluate the plasticizers, and Table 7 below shows the plastisol screen ink formulation evaluated.

TABLE 5

Simple Plastisol Formulation, Basic Screening

| Raw Material | PHR | % |
|---|---|---|
| Dispersion Resin (Geon ® 121A) | 100 | 58 |
| Plasticizer | 70 | 40 |
| Heat Stabilizer (Mark ® 1221) | 3 | 2 |

TABLE 6

Spread Coating Starting Formulation

| Raw Material | PHR | % |
|---|---|---|
| Dispersion Resin (Geon 121A) | 75 | 44.9 |
| Blending Resin (Geon 217) | 25 | 15 |
| Plasticizer | 45 | 26.9 |
| Isodecyl Benzoate | 10 | 6 |
| Viscosity Control Additive | 5 | 3 |
| Heat Stabilizer (Mark 1221) | 3 | 1.8 |
| Epoxidized Soybean Oil | 4 | 2.4 |

TABLE 7

Plastisol Screen Ink, Starting Formulation

| Raw Material | PHR | % |
|---|---|---|
| Dispersion Resin (Geon 121A) | 100 | 30.5 |
| Plasticizer | 100 | 30.5 |
| Diluent Plasticizer (Isodecyl Benzoate) | 6 | 1.8 |
| Dispersant (BYK ® 1148) | 2 | 0.1 |

TABLE 7-continued

Plastisol Screen Ink, Starting Formulation

| Raw Material | PHR | % |
|---|---|---|
| CaCO$_3$ | 60 | 18.3 |
| TiO$_2$ | 60 | 18.3 |

Example 9—Basic Screening—Plastisol

Figure 12:
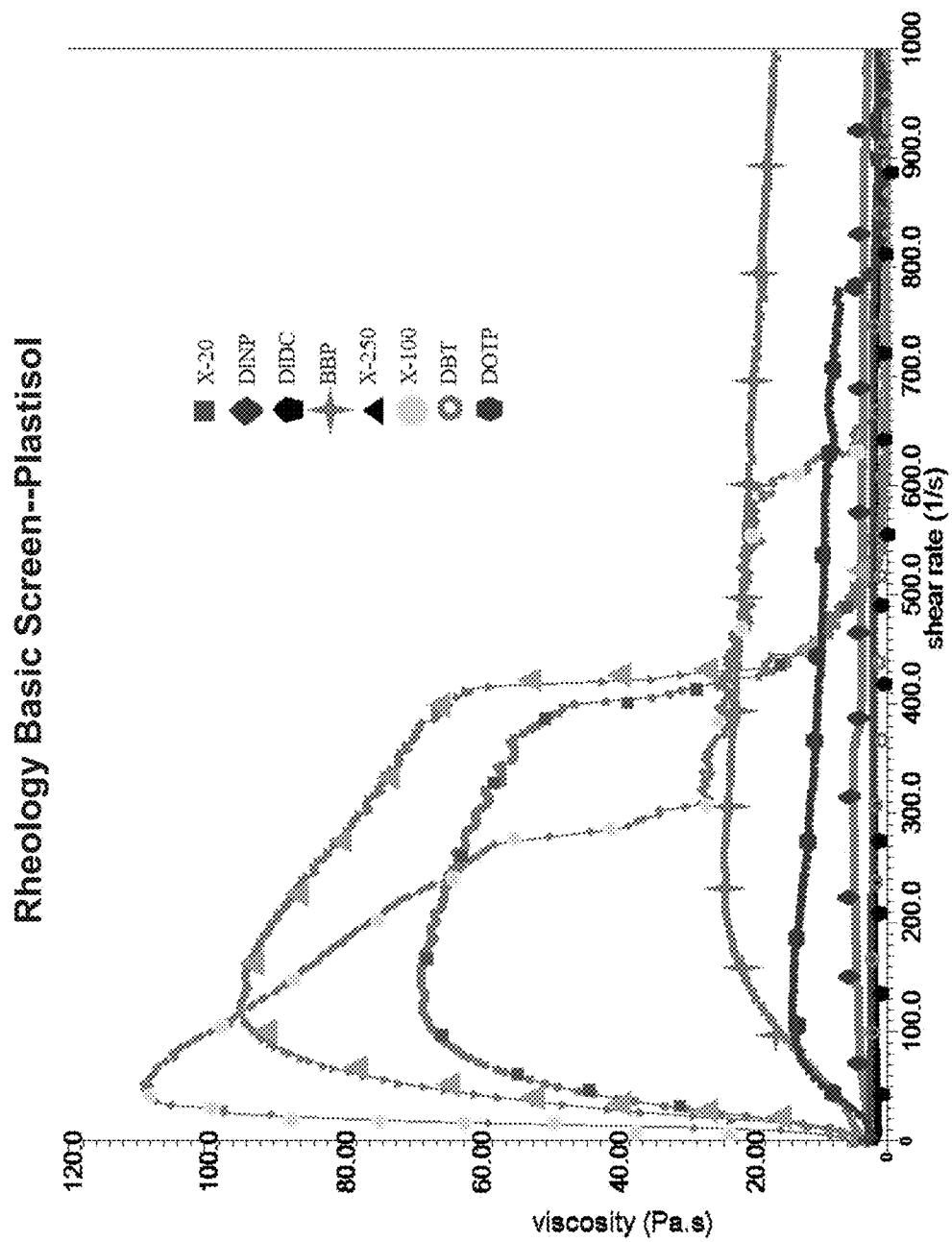
FIG. 12 is a graph reflecting the results of a basic rheology screen for a basic plastisol formulation comprising the inventive triblend, a dibenzoate diblend (DEGDB/DPGDB), PGDB, DINP, DIDC, BBP, DBT, or DOTP.
Figure 13:
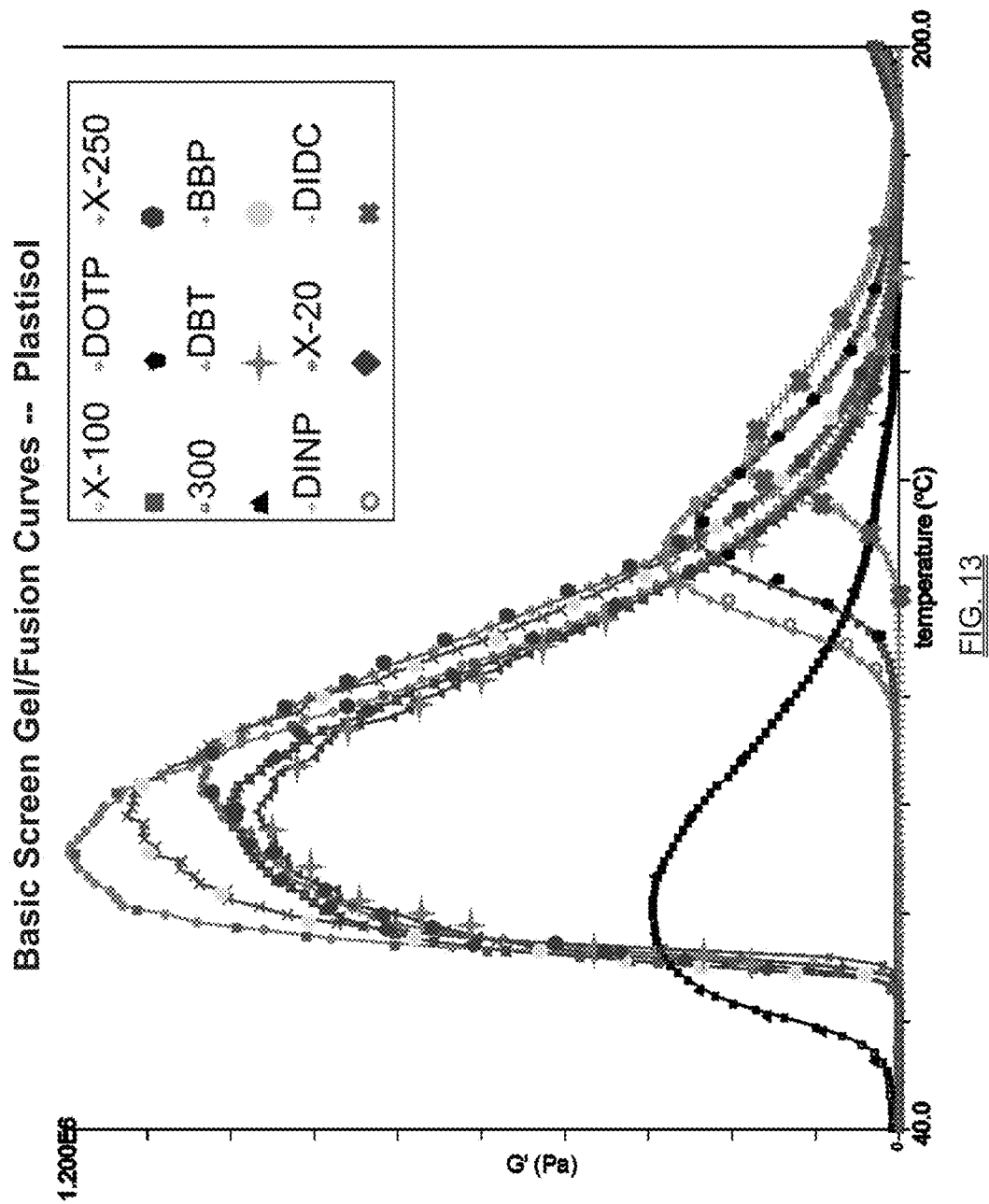
FIG. 13 is a graph reflecting gel fusion curves for a basic plastisol formulation comprising the inventive triblend, a dibenzoate diblend (DEGDB/DPGDB), PGDB, DINP, DIDC, BBP, DBT, DOTP or an alkyl pyrrolidone (300).

The results obtained in the basic screening using the simple plastisol formulation (Table 5) are shown below in Tables 8 and 9 and are further reflected in FIGS. 12 and 13.

TABLE 8

Performance Properties, Basic Formulation (From Table 5)

| Property | X-20 | X-250 | X-100 | DINP | DIDC | DOTP | DBTP | 300 | BBP |
|---|---|---|---|---|---|---|---|---|---|
| Compatibility | | | | | | | | | |
| Loop, RT to 28 days | C | C | C | C | C | C | PC | PC | C |
| Roll, 60° C. for 3 days | C | C | C | C (SI) | I | I | C | C | C |
| Efficiency | | | | | | | | | |
| Shore A, 10 second | 67 | 66 | 66 | 70 | 67 | 70 | 62 | 52 | 65 |
| Tensile parameters | | | | | | | | | |
| Tensile at break, MPa | 18.8 | 21.3 | 18.6 | 17.9 | 16.4 | 12.7 | 12.6 | 11.4 | 18.8 |
| 100% modulus, MPa | 6.4 | 7.2 | 8.5 | 7.7 | 7.3 | 5.7 | 3 | 3.8 | 6.8 |
| Elongation, % | 390 | 350 | 280 | 390 | 340 | 280 | 460 | 410 | 340 |
| Permanence | | | | | | | | | |
| Extraction | | | | | | | | | |
| Heptane, 24 hrs, % | −2.1 | −2.2 | −1.4 | −37 | −41 | −41 | −8.9 | −9.0 | −2.9 |
| 1% Soap, 24 hrs, % | −6.2 | −6.3 | −3.9 | −1.6 | −1.8 | −1.7 | −4.5 | −11.2 | −3.5 |
| Peanut oil. 24 hrs., % | −1.2 | −1.4 | −0.6 | −5.5 | −11.4 | −8.7 | −4.2 | −6.3 | −1.4 |
| Act. Char. Vol., 70° C. | | | | | | | | | |
| 1 Day, % | −4.0 | −4.2 | −4.4 | −1.6 | −1.4 | −1.7 | −7.0 | −3.9 | −2.3 |
| 3 Day, % | −6.4 | −6.9 | −7.6 | −2 | −2. | −2.1 | −14.8 | −8.1 | −3.9 |
| 7 Day, % | −9.1 | −8.8 | −12.5 | −2.5 | −2.8 | −2.6 | −23.9 | −16.3 | −6.1 |
| 14 Day, % | −12.0 | −10.7 | −18.6 | −3.1 | −4. | −3.4 | −29.8 | 24.7 | −10.0 |
| 21 Day, % | −14.7 | −12.3 | −22.7 | −3.7 | −5.1 | −4.3 | −31.7 | 29.3 | −13.3 |
| 28 Day, % | −16.1 | −13.7 | −24.2 | −4.2 | −6.1 | −4.9 | −32.4 | 31.7 | −16.2 |
| Processability | | | | | | | | | |
| Viscosity, Brookfield RVT, 20 RPM, 23° C. | | | | | | | | | |
| Initial, 1 hour, mPa · s | 3740 | 3720 | 3120 | 2070 | 1060 | 1630 | 1390 | 25150 | 1980 |
| 1 day, mPa · s | 4800 | 5800 | 4200 | 2380 | 1270 | 1860 | 2880 | Gel | 4230 |
| 28 day, mPa · s | 5500 | 5880 | 7380 | 2830 | 2020 | 2670 | 7200 | Gel | 4620 |
| Gel temperature, ° C. | 56 | 58 | 59 | 90 | 111 | 102 | 57 | — | 59 |
| Foam/Break, sec. | 13/50 | 9/53 | 12/>300 | 6/100 | 5/135 | 5/134 | 13/150 | 7/150 | 19/86 |
| Heat Stability @ 195° C. | | | | | | | | | |
| Minutes to first color | 8 | 8 | 8 | 10 | 12 | 12 | 8 | <6 | 8 |
| Minutes to brown | 14 | 12 | 14 | 16 | 18 | 18 | 16 | 6 | 16 |

TABLE 9

Gel/Fusion Curve Data, Basic Formulation (from Table 5)

| Plasticizer | Initial Inflection Temperature. ° C. | Gel Peak Temperature, ° C. | G', Pa | G' × G'' Cross Temperature, ° C. |
|---|---|---|---|---|
| X-20 | 63 | 91 | 1.2 × 10$^6$ | 168 |
| X-250 | 60 | 91 | 1.0 × 10$^6$ | 168 |
| X-100 | 60 | 81 | 1.2 × 10$^6$ | 165 |
| DINP | 79 | 126 | 3.6 × 10$^5$ | 179 |
| DIDC | 107 | 139 | 2.2 × 10$^5$ | 181 |
| DOTP | 81 | 129 | 2.9 × 10$^5$ | 177 |
| DBTP | 59 | 87 | 9.3 × 10$^5$ | 167 |
| 300 | 47 | 71 | 3.5 × 10$^5$ | 158 |
| BBP | 61 | 86 | 1.1 × 10$^6$ | 167 |

The above data shows that the inventive dibenzoate blends were more compatible than the general purpose non-phthalates with vinyl as illustrated in particular by the loop test and roll test data. The viscosity/rheology of dibenzoate blends are known to be inferior to general purpose plasticizers. However, unexpectedly, the inventive triblend, a high solvator, exhibited lower than expected viscosity (FIG. 12), which provides viable options for formulating plastisols requiring high solvator type plasticizers, while minimizing the viscosity/rheology limitations heretofore known for standard dibenzoate plasticizer blends.

The TA AR2000ex rheometer in oscillatory mode was used to generate gel/fusion characteristics to evaluate solvator properties. Table 9 lists the data obtained, and FIG. 13 illustrates the curves developed based upon the data. Based on the data, it is clear that the dibenzoates, BBP, DBTP and 300 were much better solvators than all of the general purpose type plasticizers. This demonstrated that gaining full strength at a lower temperature is possible using the inventive blends, which translates to speed in production. The classic gel point data also demonstrated this point. The 300 was the most aggressive high solvator, but very low gel strength was developed.

With respect to efficiency, the data obtained shows that dibenzoate blends are somewhat more efficient than DINP, but the other phthalate and high solvators were somewhat more efficient than the dibenzoates. X 100 was the least efficient.

With respect to extraction and volatility, the data indicated that general purpose plasticizers were extracted in massive quantities by solvent and oils but were good against aqueous solutions. The opposite was true for high solvators. Also, general purpose plasticizers were less volatile than the higher solvators. 300 and DBT were very volatile compared to the other high solvators tested, while BBP was the lowest in volatility. The inventive triblend, X 20, and the diblend, X 250, were similar in volatility and less volatile, respectively, than BBP. The activated charcoal test for volatility is generally run for only one day. For this example, the test was extended to 28 days to demonstrate what happens with plasticizers exposed over the long term. Dibenzoate plasticizers always contain residual reaction products that tend to come off early with time, which was supported by the data. X 100 was more volatile than the dibenzoate blends.

The dibenzoate plasticized vinyls and, indeed, all high solvator plasticized vinyl, exhibited poorer heat stability than the general purpose plasticized vinyl's. 300 had extremely poor heat stability.

Overall, in comparison to the other high solvators, the dibenzoates performed quite well. This was particularly true in comparison to the newer non-phthalate type plasticizer, the N-alkyl pyrrolidone (300).

Example 10—Spread Coating Starting Formulation Performance

Figure 14:
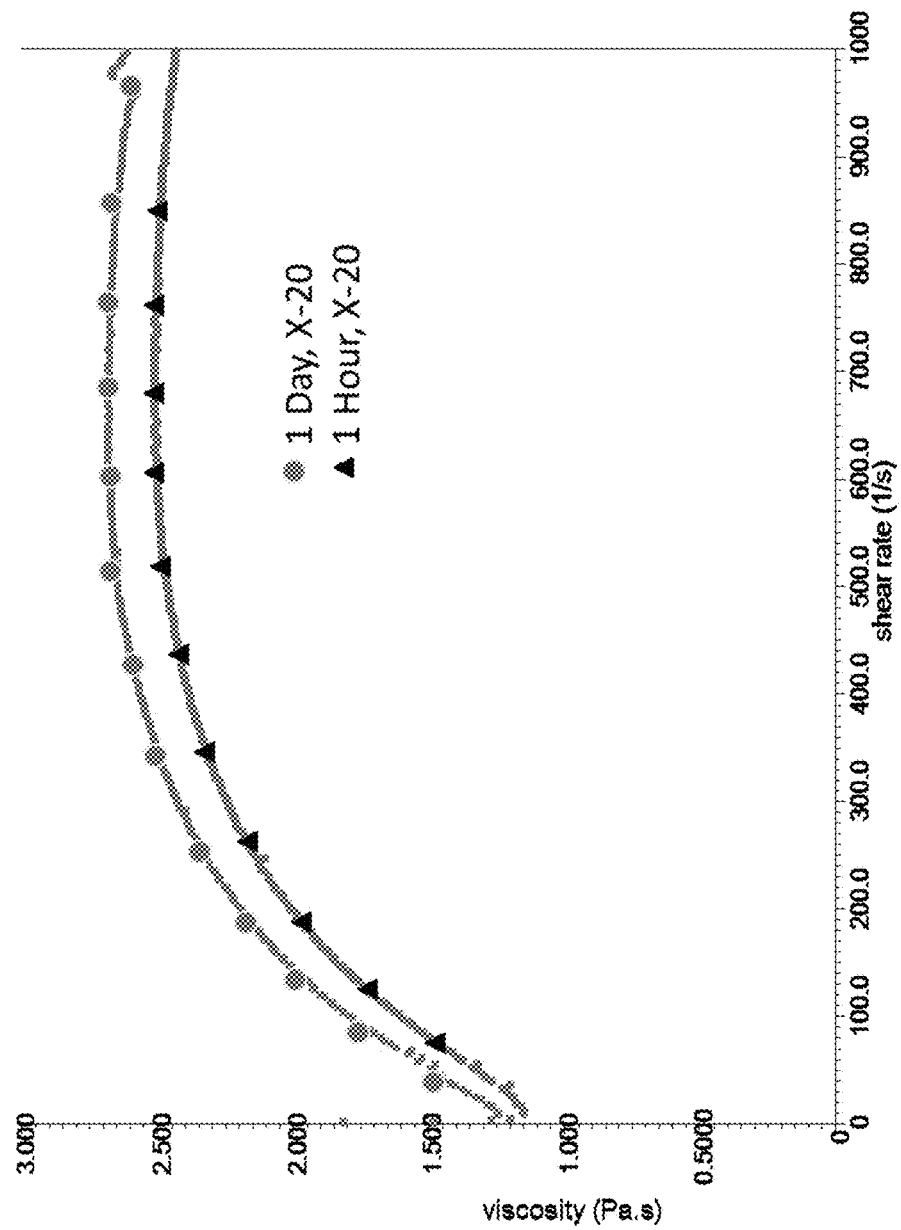
FIG. 14 is a graph reflecting a basic rheology screen for the inventive triblend at 1 hour and 1 day in a basic spread coating formulation.
Figure 15:
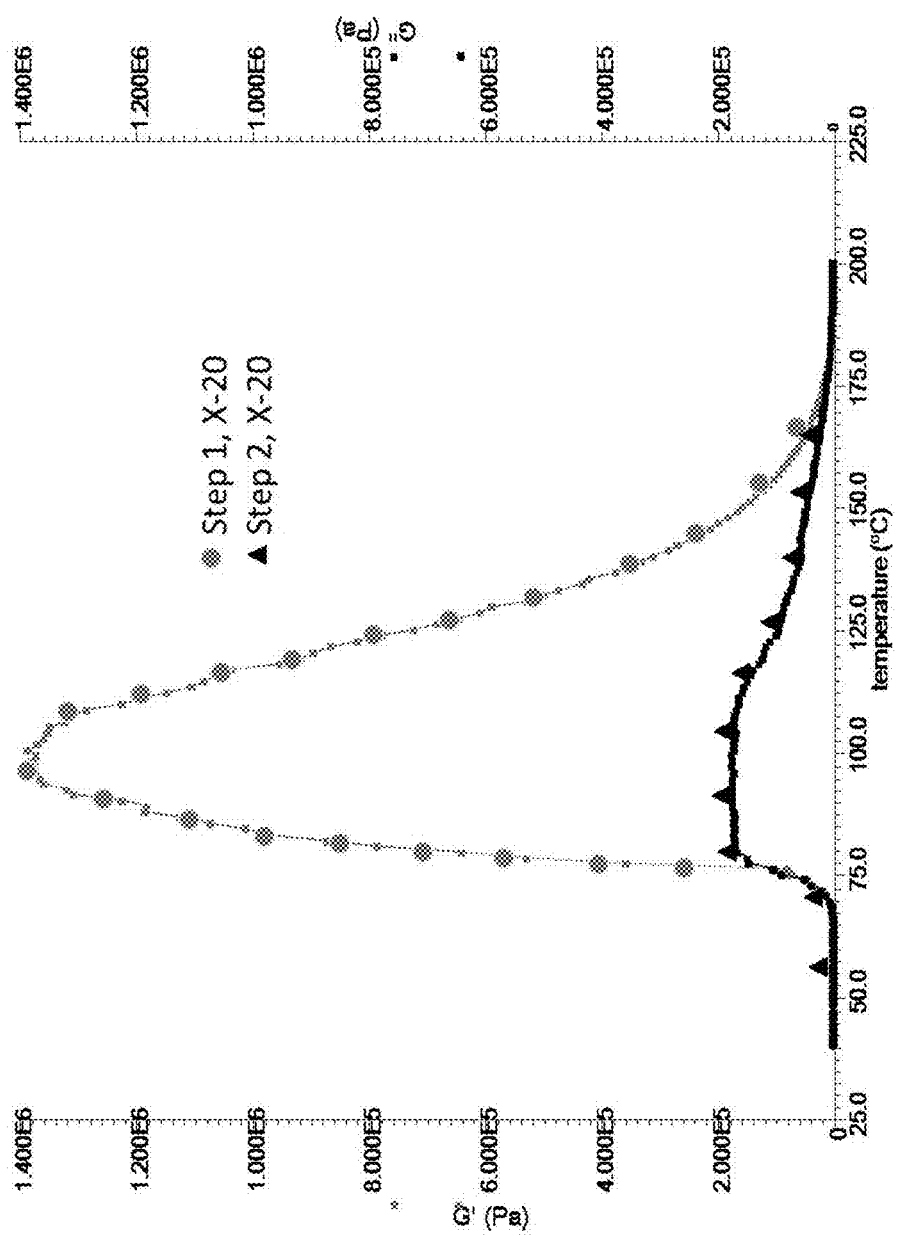
FIG. 15 is a graph reflecting a gel/fusion curve for the inventive triblend in a basic spread coating formulation.

The plasticizers were evaluated in the spread coating starting formulation reflected in Table 6. FIG. 14 illustrates the excellent rheology and viscosity demonstrated by the inventive triblend, X 20, in the formulation. FIG. 15 illustrates the excellent gel/fusion characteristics obtained for X 20.

Figure 16:
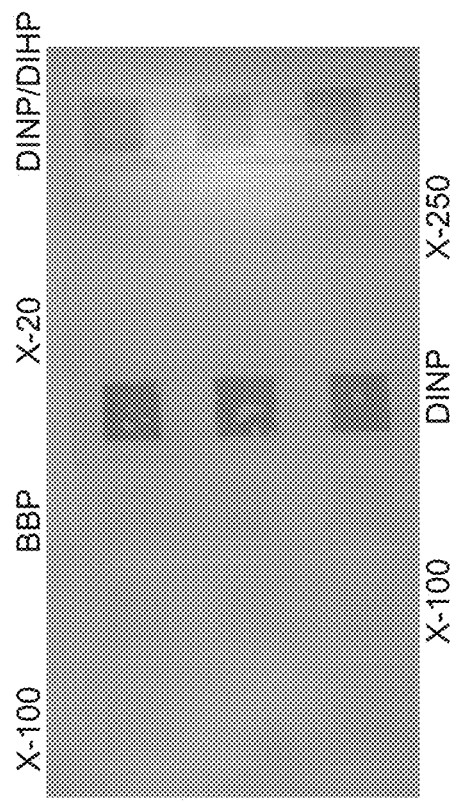
FIG. 16 is a photograph reflecting stain resistance of vinyl with PGDB, a dibenzoate diblend (DEGDB/DPGDB), the inventive triblend, DINP, a DINP/DIHP blend, and BBP.

FIG. 16 shows the stain resistance of the vinyl with X 100, X 250 and X 20 as compared to DINP, a DINP blend with DIHP, and BBP. All of the benzoates showed excellent stain resistance to Oil Brown dye (indicator of foot traffic staining). By visual inspection, X 20 plasticized vinyl appeared to be the most stain resistant of the dibenzoates.

Example 11—Plastisol Screen Ink Performance

Figure 17:
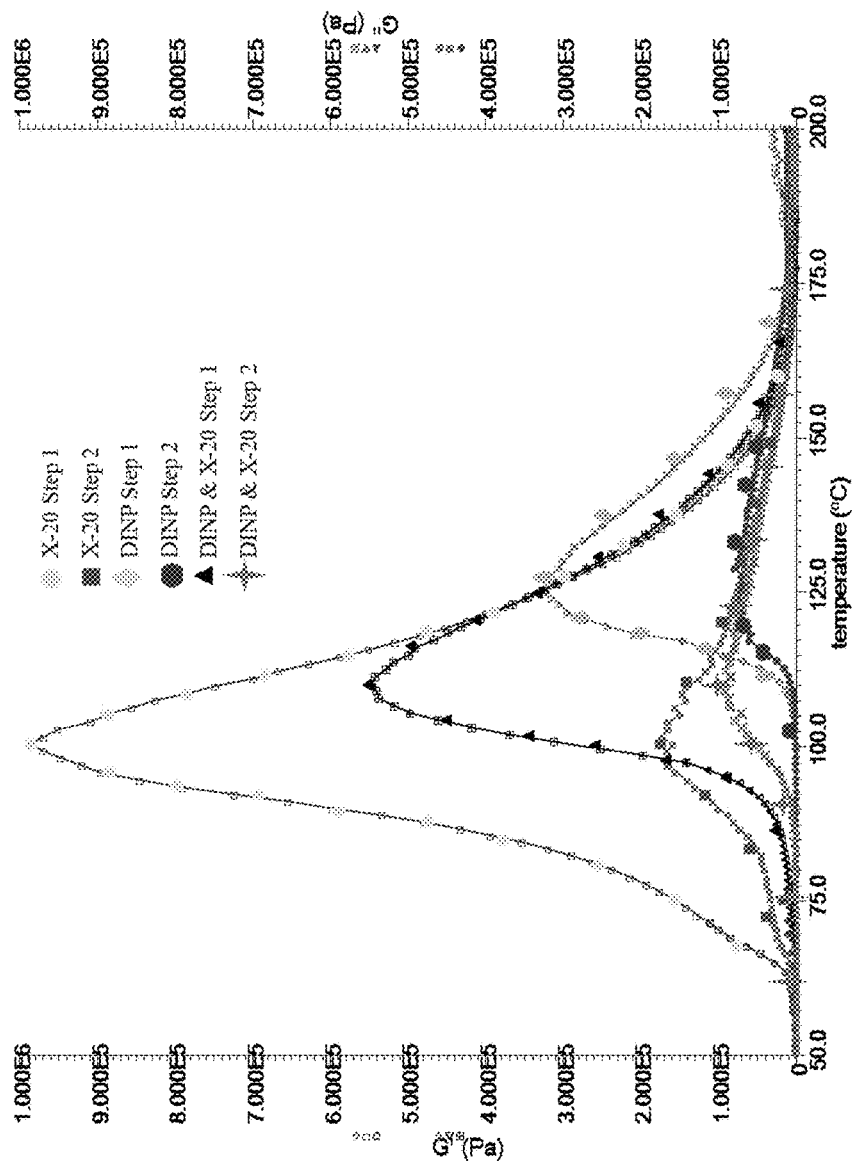
FIG. 17 is a graph reflecting gel/fusion curves for a plastisol screen ink comprising the inventive triblend, DINP, and a 50:50 blend of the inventive triblend with DINP.
Figure 18:
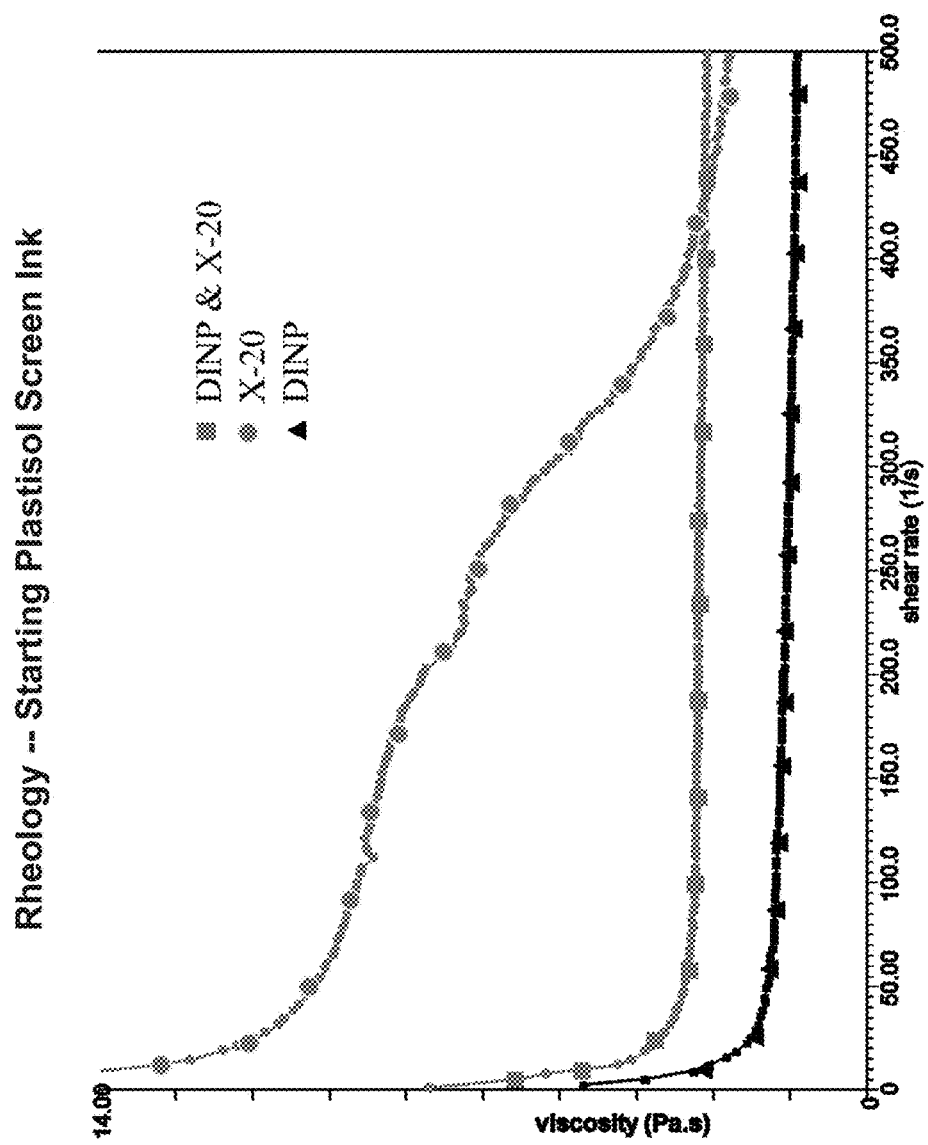
FIG. 18 is a graph reflecting rheology data obtained for a plastisol screen ink comprising the inventive triblend, DINP, and a 50:50 blend of the inventive triblend with DINP.

The starting plastisol screen ink evaluated is shown in Table 7. X 20, a 50:50 blend of X20 and DINP, and DINP alone were evaluated as plasticizers in the ink formulation. Excellent rheology and viscosity were obtained for X 20 as reflected in FIGS. 17 and 18. Gel/fusion properties for X 20 were also superior. The blend (X20 and DINP) showed improved properties as well, illustrating that the high solvator X 20 enhanced the performance of the general purpose plasticizer.

Based on all the foregoing, the inventive dibenzoate blends and new grade glycol dibenzoate offered new options as high solvators for vinyl applications. By nature, the dibenzoates have always been non-phthalates and are safe products to use with a proven track record of performance. Even so, the new triblend of dibenzoates, X 20, showed good handling characteristics and excellent performance as a high solvator. Plastisol rheology was good and stain resistance of vinyl plasticized with X 20 was superior to available general purpose plasticizers and the diblend.

X 250, the diblend, was efficient in vinyl.

X 100, the propylene glycol dibenzoate, offers an excellent high solvator alternative for vinyl, although it is somewhat less efficient than the inventive triblend and the diblend. Its high modulus may be advantageous in some applications.

The inventive triblend has been shown to be an excellent choice as a non-phthalate high solvator plasticizer alternative. It may also be used in blends with other poor solvating plasticizers to improve compatibility and processability in a plastisol or as a blending plasticizer with a variety of other plasticizers to tailor application requirements.

Example 12—Adhesive Evaluation

The performance of the novel triblend, X20, was evaluated in common latex adhesives versus established plasticizers. The evaluated formulations included:
Polymers:
Polyvinyl acetate homopolymer, PVOH protected (PVAc)
Polyvinyl acetate/ethylene copolymer, 0° C. Tg, PVOH protected (PVA/E)
Plasticizers:
X 20, the inventive dibenzoate triblend.
Commercial diblend of DEG/DPG dibenzoates (K-FLEX 850 S).
X100, PGDB
Levels of plasticizer in PVAc evaluated were 5, 10, 15 and 20% on wet adhesive basis. Levels of plasticizer in PVA/E evaluated were 5, 10 and 15% on wet adhesive basis. VOC content tests were run on the neat plasticizer. On the adhesive, viscosity response and stability, compatibility (dry film), water reduction, rheology, set and open times, wet tack (rheological determination), T and 180° peel adhesion were run.

Figure 19:
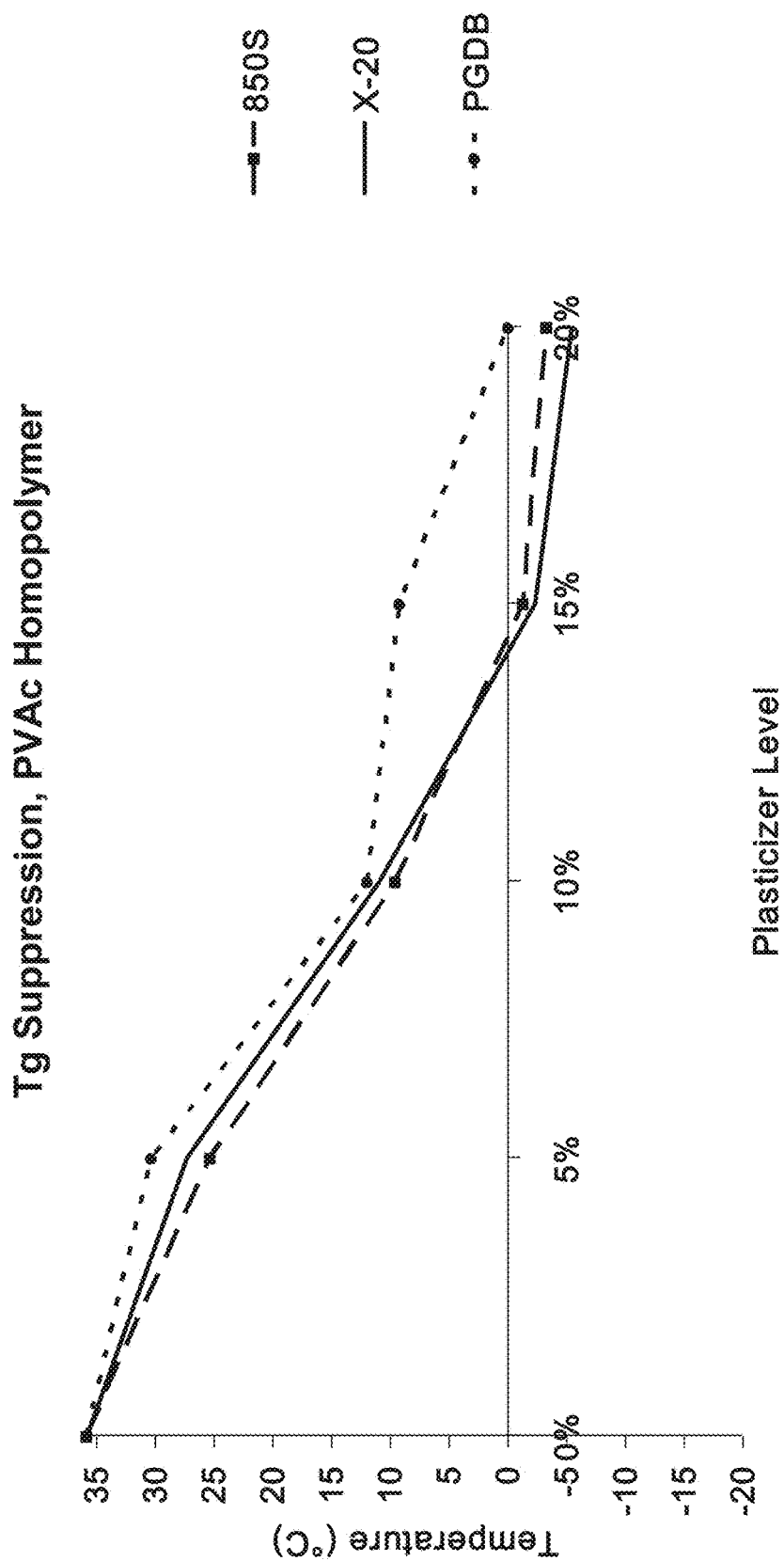
FIG. 19 is a graph showing Tg suppression curves for a PVAc homopolymer comprising the inventive triblend, a commercial dibenzoate diblend (KFLEX® 850S) or PGDB.
Figure 20:
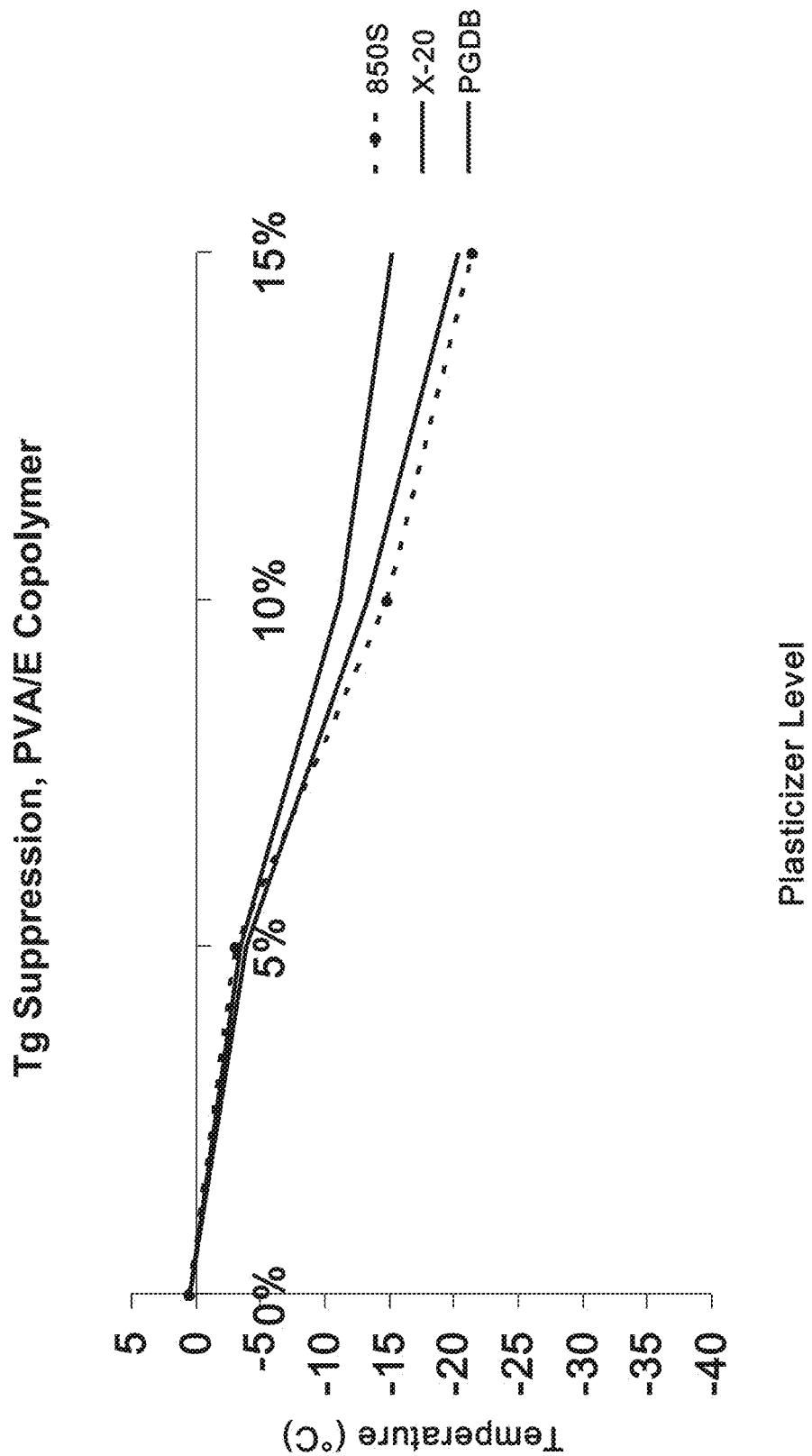
FIG. 20 is a graph showing Tg suppression curves for a PVA/E copolymer comprising the inventive triblend, a commercial dibenzoate diblend (KFLEX® 850S) or PGDB.

PVAc is a standard industry adhesive polymer. Upon addition, the plasticizer became incorporated into the polymer becoming part of the glue. The plasticized glue had a lower glass transition which resulted in a more flexible PVAc polymer, making the glue more efficient. Tg results obtained at various levels are shown in FIGS. 19 and 20. PGDB was less efficient in suppressing Tg as compared to the inventive triblend's Tg suppression. The inventive triblend's Tg suppression was better than expected considering its PGDB content in combination with the 4:1 DEGDB/DPGDB diblend. The Tg suppression of the inventive triblend was comparable to that achieved with the commercially available K-FLEX 850 S, providing a viable option for use in adhesives.

Figure 21:
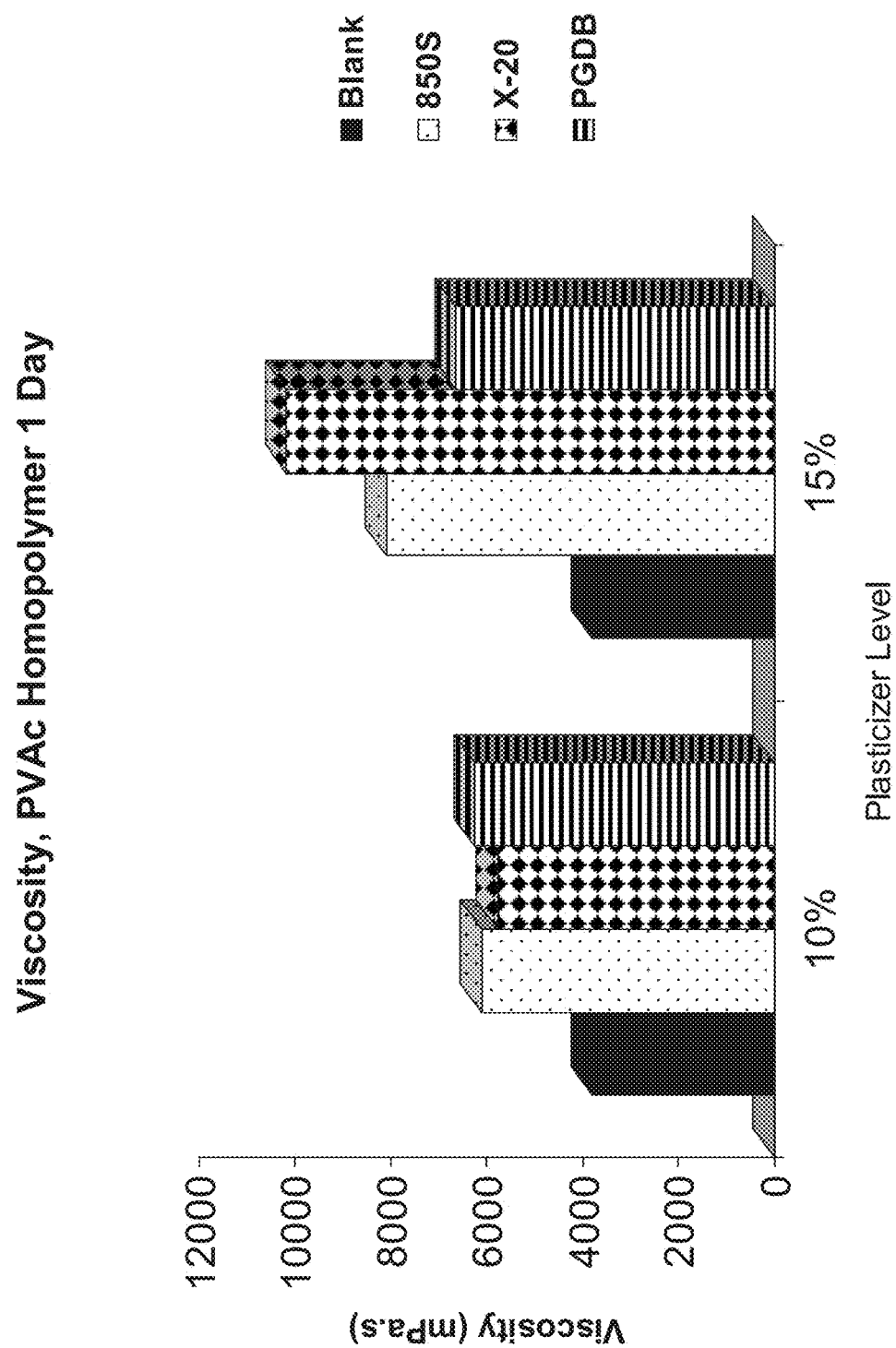
FIG. 21 is a chart reflecting viscosity levels obtained for a PVAc homopolymer at 1 day, using 10% or 15% plasticizer levels, comprising the inventive triblend, a commercial dibenzoate diblend (KFLEX® 850S), or PGDB.
Figure 22:
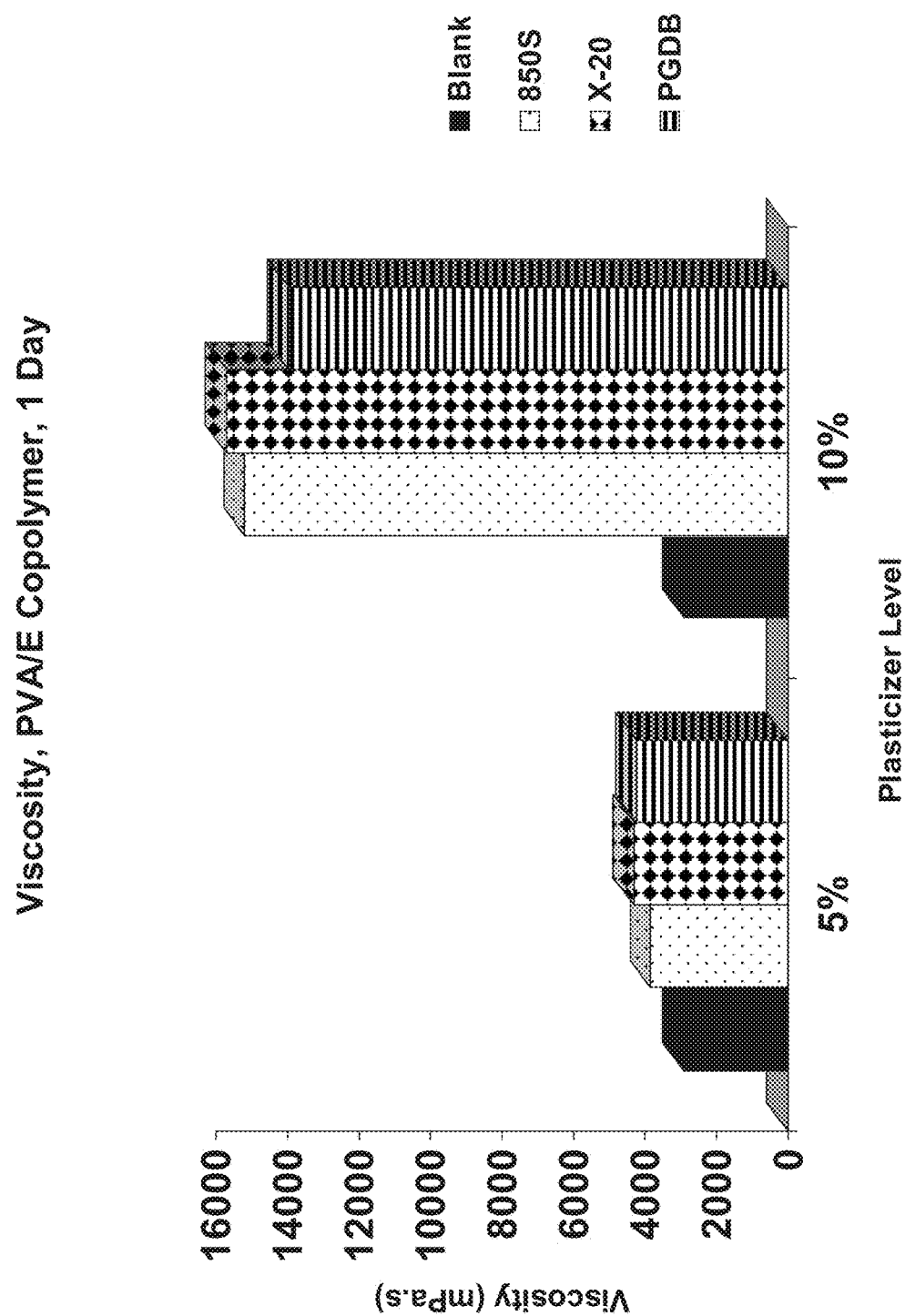
FIG. 22 is chart reflecting viscosity levels obtained for a PVA/E copolymer at 1 day, using 5% or 10% plasticizer levels, comprising the inventive triblend, a commercial dibenzoate diblend (KFLEX® 850S), or PGDB.

Viscosity results obtained are shown in FIGS. 21 and 22. Excellent viscosity response was shown for the inventive triblend, X20.

Overall, the above-described results showed that the new triblend of dibenzoates is compatible with typical latex adhesive polymers and performs similarly and in some cases better than standard binary blends (diblends) of dibenzoates.

Example 13—Overprint Varnish Evaluation

The inventive triblend was evaluated in a waterborne overprint varnish ("OPV") useful for graphic arts applications. Many of the polymers used in this industry segment are non-film formers at room temperature; consequently a plasticizer and/or a coalescent is required to help form a film properly to ensure full development of performance properties with these hard polymers. Coalescents used in the graphic arts industry typically have been the more volatile types. Traditionally, glycol ethers, phthalate esters (such as BBP) and benzoate esters (2-EHB) have been employed as plasticizers/coalescents for OPV's. While these function well, VOC content is an issue. Classically, phthalates such as DBP or BBP have been used in the graphic arts industry but recently alternatives are being sought.

Based on its broad range of compatibilities with polymers utilized in this application, the inventive triblend was evaluated in an OPV formulation, along with other traditional plasticizers or coalescents.

First, the volatility characteristics of neat plasticizers/coalescents were determined (data not shown). Both the inventive triblend X20 and the diblend X250 were determined to be less volatile than 2,2,4-Trimethyl-1,3-pentanediol monoisobutyrate (TMPDMB) (a historic coalescent of choice in paint and other coatings), BBP, 2-EHB, and several ethers (diethylene glycol monobutyl ether, diethylene glycol monomethyl ether, ethylene glycol monobutyl ether, and dipropylene glycol monomethyl ether), making it an acceptable low VOC alternative.

The basic overprint varnish formulation utilized in the viscosity response, MFFT and Konig hardness evaluations is shown below in Table 10, which reflects the addition of 4% plasticizer/coalescent.

TABLE 10

Basic Overprint Varnish Formulation

| Ingredient | No Coalescent (%) | Coalescent (%) |
|---|---|---|
| Styrene acrylic emulsion, high Tg | 64 | 60 |
| PE wax dispersion, 26% solids | 4 | 4 |
| Resin solution, 34%, high Tg | 20 | 20 |
| Wetting surfactant | 4 | 4 |
| Defoamer | 0.1 | 0.1 |
| Water | 7.9 | 7.9 |
| Plasticizer/Coalescent | 0 | 4 |

The viscosity response of the base emulsion is indicative of the compatibility of the plasticizer/coalescent tested. Viscosity data was obtained at 1 day aging. The OPV viscosity responses with 4% plasticizer/coalescent were in the range expected for the inventive triblend X 20 and the diblend X250 and were comparable to DEGDB (in the 100-150 mPa range). Viscosity responses for diethylene glycol monobutyl ether, dipropylene glycol monomethyl ether, and diethylene glycol monomethyl ether were lower.

The viscosity response to select dibenzoates in the OPV formulation with 6% coalescent instead of 4% was also measured. Both the X-250 and X-20 OPV's had viscosity of 250 mPa's, which demonstrated that a relatively low add level (increase of 2%) had a significant impact on OPV viscosity with these types of plasticizers/coalescents.

Table 11 lists the MFFT's (Minimum Film Formation Temperatures) of various OPV formulations with a 4% and a 6% add level. The data shows that all of the formulations formed films well at room temperature conditions. Water soluble coalescent types were more effective in MFFT suppression. As the MFFT depression was somewhat less for the dibenzoates than the ethers, the MFFT's of OPV's with loading at 6% wet on X20 and X250 were also determined. The results showed that less than an additional 2% add would be necessary to achieve MFFT suppression results similar to ethers. Most likely, this additional amount would not be necessary to achieve the desired development of full performance characteristics.

TABLE 11

Minimum Film Formation Temperatures

| | Temperature, ° C. | |
|---|---|---|
| OPV Coalescent | 4% | 6% |
| No Coalescent | 31 | 31 |
| X-20 | 7.2 | −4 |
| X-250 | 7.2 | −5 |
| DEGDB | 6.1 | — |
| 2-EHB | 7.2 | — |
| Diethylene glycol monomethyl ether | −1.0 | — |
| Dipropylene glycol monomethyl ether | −1.0 | — |

One question regarding the use of real plasticizers instead of volatile coalescents is the effect on parameters such as dry time. The dry-to-touch time of the OPV's was determined for the inventive triblend X20, the diblend X250, DEGDB, 2-EHB, diethylene glycol monobutyl ether, and dipropylene glycol monomethyl ether. It was noted that there was no significant difference in the time to dry-to-touch between the volatile and non-volatile plasticizers or coalescents.

Gloss values were also determined on the OPV's and were found to be similar for the inventive triblend X20, the diblend X250, DEGDB, 2-EHB, diethylene glycol monobutyl ether, and dipropylene glycol monomethyl ether.

Figure 23:
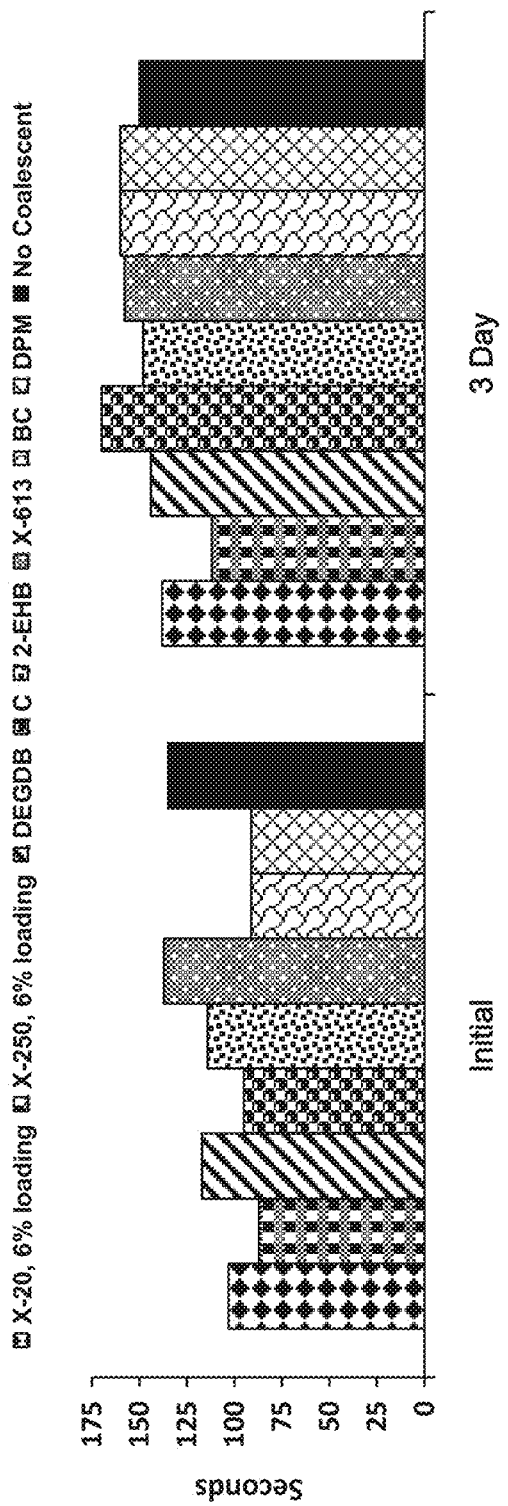
FIG. 23 is a chart reflecting Konig Hardness Data on aluminum panel for an overprint varnish formulation comprising the inventive triblend (6% loading), a dibenzoate diblend (DEGDB/DPGDB) (6% loading), DEGDB, diethylene glycol monomethyl ether, 2-EHB, a monobenzoate, dipropylene glycol monomethyl ether, diethylene glycol monobutyl ether or no coalescent.

FIG. 23 displays the Konig hardness data acquired for the OPV's formulated with plasticizers, including the inventive triblend X20, and traditional coalescents used in OPV's. Plasticizers are often disfavored for use in OPV's based upon the belief that they are more permanent than coalescents and as such will stay and soften a film resulting in poor performance. As shown in FIG. 23, the Konig Hardness data disproved this generally held belief. The 6% plasticizer films (X20 and X250) were somewhat softer than other coalescents, but as seen in the MFFT data above, they may have been over-coalesced. 4% plasticizer films were all similar to the much more volatile coalesced OPV's.

Overall, the OPV evaluation showed that the inventive triblend had low volatility, good compatibility, and comparable dry time, gloss, and hardness and, as such, is suitable for use as an alternative in OPV applications.

In accordance with the patent statutes, the best mode and preferred embodiments have been set forth; the scope of the invention is not limited thereto, but rather by the scope of the attached claims.

What is claimed is:

1. A plastisol composition, comprising:
  a. a polymeric dispersion; and
  b. a non-phthalate, high solvating plasticizer triblend comprising diethylene glycol dibenzoate present in an amount of at least about 60 wt. %, dipropylene glycol dibenzoate present in an amount of at least about 15 wt. %, and 1,2-propylene glycol dibenzoate present in an amount of at least about 20 wt. %, based upon the total weight of the triblend,
  wherein the Brookfield viscosity and freezing point of the triblend is lower than that achieved with a diethylene glycol dibenzoate/dipropylene glycol dibenzoate diblend.

2. The plastisol composition as set forth in claim 1, wherein the polymer is present at 100 parts by weight, and wherein the plasticizer triblend is present at from about 1 part to about 300 parts by weight for every 100 parts by weight of polymer.

3. The plastisol composition as set forth in claim 2, wherein the plasticizer triblend is present at about 70 parts by weight for every 100 parts by weight of polymer.

4. The plastisol composition of claim 1, wherein the triblend is further blended with a conventional plasticizer comprising: phthalate esters; phosphate esters; adipates; azelates; oleates; sebacates; succinates; terephthalates; 1,2-cyclohexane dicarboxylate esters; epoxy plasticizers; fatty acid esters; phenolic resins; amino resins; hydrocarbons and hydrocarbon derivatives; monobenzoates; 2,2,4-trimethyl-1,3-pentanediol diisobutyrate; and mixtures thereof.

5. The plastisol composition of claim 4, wherein the conventional plasticizer is selected from the group consisting of diisononyl cyclohexane-1,2-dicarboxylate, di-2-ethyl hexyl terephthalate, isononyl benzoate, isodecyl benzoate, 2-ethyl hexyl benzoate and mixtures thereof.

6. The plastisol composition of claim 1, wherein the triblend comprises 80 wt. % of a mixture of diethylene glycol dibenzoate (DEGDB) and dipropylene glycol dibenzoate (DPGDB), wherein the ratio of DEGDB to DPGDB is about 4:1, and 20 wt. % of 1,2-propylene glycol dibenzoate, based upon the total weight of the triblend.

7. The plastisol composition of claim 1, wherein the polymeric dispersion is a PVC or acrylic-based polymer.

8. The plastisol composition of claim 3, wherein the polymeric dispersion is a PVC or acrylic-based polymer.

9. The plastisol composition of claim 4, wherein the polymeric dispersion is a PVC or acrylic-based polymer.

10. The plastisol composition of claim 5, wherein the polymeric dispersion is a PVC or acrylic-based polymer.

11. The plastisol composition of claim 6, wherein the polymeric dispersion is a PVC or acrylic-based polymer.

* * * * *

UNITED STATES PATENT AND TRADEMARK OFFICE
CERTIFICATE OF CORRECTION

PATENT NO. : 9,758,637 B2
APPLICATION NO. : 14/928364
DATED : September 12, 2017
INVENTOR(S) : Arendt et al.

It is certified that error appears in the above-identified patent and that said Letters Patent is hereby corrected as shown below:

On the Title Page

Replace (73) Assignee: "Emerald Kalama Chemica l, Inc., Kalama, WA (US)" with --Emerald Kalama Chemical, LLC, Kalama, WA (US)--

In the Specification

Column 2, Line 6, replace "hexane dicarboxylate (DIDC or DINCH®) as described in" with --hexane dicarboxylate (DIDC or BASF's Hexamoll® DINCH®) (as described in--

Column 3, Line 13, replace "Monobenzoates are also not as useful as dibenzoate" with --Half esters are also not as useful as dibenzoate--

Column 3, Line 20, replace "diethylene glycol dibenzoates (DEGDB) and dipropylene" with --diethylene glycol dibenzoate (DEGDB) and dipropylene--

Column 3, Line 21, replace "glycol dibenzoates (DPGDB) esters are well known and" with --glycol dibenzoate (DPGDB) esters are well known and--

Column 3, Line 28, replace "and triethylene glycol dibenzoates (TEGDB) was introduced" with --and triethylene glycol dibenzoate (TEGDB) was introduced--

Column 5, Line 26, replace "been optimized for performance and handling in polymeric" with --be optimized for performance and handling in polymeric--

Column 5, Line 37, replace "ates (PGDB). 1,2-Propylene glycol dibenzoate is a known" with --ate (PGDB). 1,2-Propylene glycol dibenzoate is a known--

Column 7, Line 67, "1% IVORY soap." with --1% IVORY® soap.--

Signed and Sealed this
Second Day of October, 2018

Andrei Iancu
*Director of the United States Patent and Trademark Office*

CERTIFICATE OF CORRECTION (continued)
U.S. Pat. No. 9,758,637 B2

Column 8, Line 1, replace "FIG. 8 is graph reflecting Brookfield Viscosities (mPa's)" with --FIG. 8 is graph reflecting Brookfield Viscosities (mPa·s)--

Column 8, Line 43, replace "commercial dibenzoate diblend (KFLEX®850S) or PGDB" with --commercial dibenzoate diblend (K-FLEX® 850S) or PGDB--

Column 8, Line 46, replace "mercial dibenzoate diblend (KFLEX® 850S)" with --mercial dibenzoate diblend (K-FLEX® 850S)--

Column 8, Line 50, replace "dibenzoate diblend (KFLEX® 850S) or PGDB" with --dibenzoate diblend (K-FLEX® 850S) or PGDB--

Column 8, Line 54, replace "dibenzoate diblend (KFLEX® 850S) or PGDB" with --dibenzoate diblend (K-FLEX® 850S) or PGDB--

Column 10, Line 2, replace "issued compared to typical plasticizers such as phthalate" with --issue compared to typical plasticizers such as phthalate--

Column 10, Line 9, replace "-12° C. to -6° C.) which provides considerable advantages" with --~12° C. to ~6° C.), which provides considerable advantages--

Column 12, Line 17, replace "Permanence - Extraction resistance, ASTM 01239" with --Permanence - Extraction resistance, ASTM D1239--

Column 12, Line 19, replace "IVORY soap solution (24 hours at 50° C. and 4 hours dry at" with --IVORY® soap solution (24 hours at 50° C. and 4 hours dry at--

Column 12, Line 21, replace "Activated charcoal volatility, ASTM 01203 was evaluated at" with --Activated charcoal volatility, ASTM D1203 was evaluated at--

Column 14, Line 54, replace "IVORY Soap was obtained for the controls, the diblend" with --IVORY® Soap was obtained for the controls, the diblend--

Column 14, Line 58, replace "Although the extraction resistance of the triblend in IVORY" with --Although the extraction resistance of the triblend in IVORY®--

Column 20, Line 31, replace "Commercial diblend of DEG/DPG dibenzoates (K-FLEX" with --Commercial diblend of DEG/DPG dibenzoates (K-FLEX®--

Column 20, Line 54, replace "cially available K-FLEX 850 S, providing a viable option for" with --cially available K-FLEX® 850S, providing a viable option for--